United States Patent
Liu et al.

(10) Patent No.: US 9,917,678 B2
(45) Date of Patent: Mar. 13, 2018

(54) METHOD AND APPARATUS FOR GENERATING A LONG TRAINING SEQUENCE AND SENDING A SIGNAL

(71) Applicant: Huawei Technologies Co., Ltd., Shenzhen (CN)

(72) Inventors: Yalin Liu, Shenzhen (CN); Jiayin Zhang, Shenzhen (CN); Yi Luo, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 140 days.

(21) Appl. No.: 14/946,334

(22) Filed: Nov. 19, 2015

(65) Prior Publication Data

US 2016/0080127 A1 Mar. 17, 2016

Related U.S. Application Data

(63) Continuation of application No. PCT/CN2013/078200, filed on Jun. 27, 2013.

(51) Int. Cl.
*H04W 72/04* (2009.01)
*H04L 5/00* (2006.01)
(Continued)

(52) U.S. Cl.
CPC ........ *H04L 5/0053* (2013.01); *H04L 25/0202* (2013.01); *H04L 27/2613* (2013.01);
(Continued)

(58) Field of Classification Search
CPC ............... H04L 5/0053; H04L 25/0202; H04L 27/2692; H04L 27/2613; H04L 5/0048; H04W 72/0453
See application file for complete search history.

(56) References Cited

U.S. PATENT DOCUMENTS 7,453,793 B1 * 11/2008 Jones, IV ............ H04L 25/0216
370/203
2005/0180353 A1 * 8/2005 Hansen ................. H04L 1/0001
370/328
(Continued)

FOREIGN PATENT DOCUMENTS

| CN | 1697356 A | 11/2005 |
|---|---|---|
| CN | 101123469 A | 2/2008 |
| CN | 102695264 A | 9/2012 |

OTHER PUBLICATIONS

"IEEE Standard for Information technology—Telecommunications and information exchange between systems; Local and metropolitan area networks—Specific requirements; Part 11: Wireless LAN Medium Access Control (MAC) and Physical Layer (PHY) Specifications," IEEE Std 802.11-2012, pp. i-2695, Institute of Electrical and Electronics Engineers, New York, New York (Mar. 29, 2012).
(Continued)

*Primary Examiner* — Jay P Patel
(74) *Attorney, Agent, or Firm* — Leydig, Voit & Mayer, Ltd.

(57) ABSTRACT

The present disclosure discloses a method and an apparatus for generating a long training sequence and sending a signal, and belongs to the field of wireless communications. The method includes: obtaining a plurality of long training sequences according to a system parameter and a preset sequence construction formula, wherein the plurality of long training sequences include a plurality of basic training sequences and a plurality of shift training sequences obtained according to cyclic shift of the basic training sequences; and configuring a mapping rule between a terminal device and a long training sequence, for enabling the terminal device to select a long training sequence according to the mapping rule as a long training sequence for sending a signal. By adopting the present disclosure, energy con-
(Continued)

sumption of the receiving end may be reduced and accuracy of channel estimation may be improved.

19 Claims, 10 Drawing Sheets

(51) Int. Cl.
  *H04L 27/26* (2006.01)
  *H04L 25/02* (2006.01)
(52) U.S. Cl.
  CPC ..... *H04L 27/2692* (2013.01); *H04W 72/0453* (2013.01); *H04L 5/0048* (2013.01)

(56) References Cited

U.S. PATENT DOCUMENTS

| | | | | |
|---|---|---|---|---|
| 2005/0180360 A1* | 8/2005 | Hansen | ................ | H04B 7/0667 370/334 |
| 2005/0180361 A1* | 8/2005 | Hansen | ................ | H04L 5/0023 370/334 |
| 2005/0180386 A1* | 8/2005 | Hansen | ............... | H04L 27/2613 370/350 |
| 2005/0181728 A1* | 8/2005 | Hansen | ................ | H04B 7/0613 455/41.2 |
| 2005/0271157 A1* | 12/2005 | van Zelst | .................. | H04L 1/06 375/267 |
| 2005/0281241 A1* | 12/2005 | Webster | ............. | H04L 27/2613 370/343 |
| 2005/0286474 A1* | 12/2005 | van Zelst | ............ | H04L 27/2613 370/334 |
| 2006/0002361 A1* | 1/2006 | Webster | ............... | H04B 7/0697 370/343 |
| 2006/0092892 A1* | 5/2006 | Trachewsky | ......... | H04B 7/0697 370/338 |
| 2006/0182191 A1* | 8/2006 | Darwood | ............. | H04B 7/0632 375/267 |
| 2006/0274852 A1* | 12/2006 | Trachewsky | .......... | H04L 1/0002 375/295 |
| 2009/0028106 A1 | 1/2009 | Hansen et al. | | |
| 2009/0285339 A1* | 11/2009 | Zhang | ................. | H04J 13/0014 375/343 |
| 2010/0061402 A1* | 3/2010 | van Zelst | .............. | H04L 5/0023 370/474 |
| 2011/0013532 A1* | 1/2011 | Wu | .......................... | H04L 5/005 370/252 |
| 2011/0142020 A1 | 6/2011 | Kang et al. | | |
| 2011/0211594 A1 | 9/2011 | Van Nee | | |
| 2013/0107893 A1* | 5/2013 | Zhang | ....................... | H04L 1/00 370/474 |
| 2013/0272198 A1* | 10/2013 | Azizi | .................... | H04W 72/02 370/328 |
| 2013/0343211 A1* | 12/2013 | Liu | ..................... | H04L 25/0204 370/252 |
| 2015/0023272 A1* | 1/2015 | Choi | .................. | H04L 27/2613 370/329 |
| 2015/0049701 A1* | 2/2015 | Tian | ...................... | H04W 24/10 370/329 |

OTHER PUBLICATIONS

"IEEE Standard for Information technology—Telecommunications and information exchange between systems; Local and metropolitan area networks—Specific requirements; Part 11: Wireless LAN Medium Access Control (MAC) and Physical Layer (PHY) Specifications; Amendment 4: Enhancements for Very High Throughput for Operation in Bands below 6 GHz," IEEE Std 802.11ac-2013, pp. i-395, Institute of Electrical and Electronics Engineers, New York, New York (Dec. 11, 2013).

Kang et al., "VHT-LTF Design for IEEE802.11ac," IEEE 802.11-10/0779r0, PowerPoint, Institute of Electrical and Electronics Engineers, New York, New York (Jul. 2010).

* cited by examiner

METHOD AND APPARATUS FOR GENERATING A LONG TRAINING SEQUENCE AND SENDING A SIGNAL

CROSS-REFERENCE TO RELATED APPLICATIONS

This application is a continuation of International Patent Application No. PCT/CN2013/078200, filed on Jun. 27, 2013, which is hereby incorporated by reference in its entirety.

TECHNICAL FIELD

The present disclosure relates to the field of wireless communications, and in particular, to a method and an apparatus for generating a long training sequence and sending a signal.

BACKGROUND

With wide application of an intelligent terminal, a demand of people on a network traffic is increasing. In order to meet a demand of people on surfing an internet at any time and anywhere, performance of a network system should be improved. Therefore, great evolution has been made on a cellular network, for 3GPP (The 3rd Generation Partnership Project), from GSM (Global System for Mobile communications) to UMTS (Universal Mobile Telecommunications System), LTE (Long Term Evolution), and LTE-Advanced, and a Wi-Fi (wireless fidelity) system in a wireless local area network has evolved from IEEE 802.11a/b to 802.11g, 802.11n and 802.11ac.

At a same time, great progress has also been made in a field of sequence design, and the cellular network absorbs a research result in the field of the sequence design in time, and introduces a Zadoff-Chu sequence with a perfect autocorrelation property. However, the Wi-Fi system fails to follow up in time, and LTF (Long Training Field) still uses a pseudo-noise sequence as a basic sequence for generating the LTF.

Specifically, an existing long training sequence has the following several forms.

(1) In IEEE 802.11a and IEEE 802.11g, an expression of the long training sequence on a frequency domain is as follows:

$L_{-26,26} = \{1,1,-1,-1,1,1,-1,1,-1,1,1,1,1,1,1,-1,-1,1,1,-1,$
$1,-1,1,1,1,1,0,1,-1,-1,1,1,-1,1,-1,1,-1,-1,-1,-1,-1,1,1,$
$-1,-1,1,-1,1,-1,1,1,1,1\}.$

A structure of an OFDM training frame of 802.11g is as shown in FIG. 1, and the long training sequence occupies two OFDM symbols on a time domain, which is mainly used for improving precision of channel estimation.

(2) In IEEE 802.11n, under a 20 MHz bandwidth and a 40 MHz bandwidth, long training sequence symbols for high speed transmission are respectively:

$HTLTF_{-28,28} = \{1,1,1,1,-1,-1,1,1,-1,1,-1,1,1,1,1,1,1,-1,$
$-1,1,1,-1,1,-1,1,1,1,1,0,1,-1,-1,1,1,-1,1,-1,1,-1,-1,-1,$
$-1,-1,1,1,-1,-1,1,-1,1,-1,1,1,1,1,-1,-1\};$ $HTLTF_{-58,58} = \{1,1,-1,-1,1,1,-1,1,-1,1,1,1,1,1,1,-1,-1,$
$1,1,-1,1,-1,1,1,1,1,1,1,-1,-1,1,1,-1,1,-1,1,-1,-1,-1,-1,$
$-1,1,1,-1,-1,1,-1,1,-1,1,1,1,1,-1,-1,-1,-1,1,1,0,0,0,-1,1,1,-1,$
$1,1,-1,-1,1,1,-1,1,-1,1,1,1,1,1,1,-1,-1,1,1,-1,1,-1,1,1,1,1,1,$
$1,1,-1,-1,1,1,-1,1,-1,1,-1,-1,-1,-1,-1,1,1,-1,-1,1,-1,1,-1,1,1,$
$-1,1,1,1,1\};$ where a format of the LTF in a high speed-greenfield frame HT-greenfield PPDU (Physical layer Protocol Data Unit) is as shown in FIG. 2.

(3) In EEE 802.11ac, expressions of VHTLTF in bandwidths of 20 MHz, 40 MHz, 80 MHz and 160 MHz are respectively shown as follows:

$VHTLTF_{-28,28} = \{1,1,LTF_{left},0,LTF_{right},-1,-1\} = HTLTF_{-28,28};$ $VHTLTF_{-58,58} = \{LTF_{left},1,LTF_{right},-1,-1,-1,1,0,0,0,-1,$
$1,1,-1,LTF_{left},1,LTF_{right}\} = HTLTF_{-58,58};$ $VHTLTF_{-122,122} = \{LTR_{left},1,LTF_{right},-1,-1,-1,1,1,-1,$
$1,-1,1,1,-1,LTF_{left},1,LTF_{right},1,-1,1,-1,0,0,0,1,-1,-1,1,1,$
$LTF_{left},1,LTF_{right},-1,-1,-1,1,1,-1,1,-1,1,1,-1,LTF_{left},1,$
$LTF_{right}\};$ $VHTLTF_{-250,250} = \{VHTLTF_{-122,122},0,0,0,0,0,0,0,0,0,0,0,$
$VHTLTF_{-122,122}\};$ where sequences represented by $LTF_{left}$ and $LTF_{right}$ are as follows:

$LTF_{left} = \{1,1,-1,-1,1,1,-1,1,-1,1,1,1,1,1,1,-1,-1,1,1,-1,$
$1,-1,1,1,1,1\};$ $LTF_{right} = \{1,-1,-1,1,1,-1,1,-1,1,1,-1,-1,-1,-1,-1,1,1,1,$
$-1,-1,1,-1,1,-1,1,1,1,1\}.$ A format of VHTLTF in VHT PPDU is as shown in FIG. 3.

At least the following problems exist in the prior art.

In an existing Wi-Fi system, all transmitting ends use a same long training sequence, and a receiving end may not distinguish the transmitting ends according to the long training sequence. After the receiving end receives a signal, no matter the signal is sent to itself or not, the receiving end needs to demodulate the signal, because the receiving end can not distinguish the transmitting ends in a physical layer and can only distinguish the transmitting ends in an MAC layer. Moreover, it can be seen from the above-mentioned autocorrelation property curve that, an autocorrelation property of an LTF sequence is not ideal and its ability to resist frequency offset is poor.

SUMMARY

The present disclosure provides a method and an apparatus for generating a long training sequence and sending a signal, which reduce system interference and improves accuracy of channel estimation. Technical solutions are as follows.

In a first aspect, a method for generating a long training sequence is provided, including:

obtaining a plurality of long training sequences according to a system parameter and a preset sequence construction formula, where the plurality of long training sequences include a plurality of basic training sequences and a plurality of shift training sequences obtained according to cyclic shift of the basic training sequences; and configuring a mapping rule between a terminal device and a long training sequence, for enabling the terminal device to select a long training sequence according to the mapping rule as a long training sequence for sending a signal.

In combination with the first aspect, in the first possible implementation manner of the first aspect, the obtaining the plurality of long training sequences according to the system parameter and the preset sequence construction formula includes:

obtaining a number of available subcarriers according to the system parameter;

determining the preset sequence construction formula;

determining a sequence length according to the number of the available subcarriers and the determined preset sequence construction formula;

obtaining the plurality of basic training sequences conforming to the sequence length according to the preset sequence construction formula and the determined sequence length; and performing cyclic shift on each basic training sequence in the plurality of basic training sequences to generate the plurality of shift training sequences.

In combination with the first aspect, in the second possible implementation manner of the first aspect, after the obtaining the plurality of long training sequences according to the system parameter and the preset sequence construction formula, the method further includes:

generating long training symbols of the plurality of long training sequences on a frequency domain according to the plurality of long training sequences, a length of the long training sequence and a number of system subcarriers.

In combination with the first aspect, in the third possible implementation manner of the first aspect, the configuring the mapping rule between the terminal device and the long training sequence includes:

configuring a mapping rule between an access point (AP) in a wireless local area network environment and the long training sequence; and/or, configuring a mapping rule between a station (STA) in a wireless local area network environment and the long training sequence.

In combination with the third possible implementation manner of the first aspect, in the fourth possible implementation manner of the first aspect, the configuring the mapping rule between the access point (AP) in the wireless local area network environment and the long training sequence includes:

configuring the mapping rule between the access point (AP) and the long training sequence as that the AP selects an unused long training sequence from the plurality of long training sequences.

In combination with the fourth possible implementation manner of the first aspect, in the fifth possible implementation manner of the first aspect, the configuring the mapping rule between the access point (AP) and the long training sequence as that the AP selects the unused long training sequence from the plurality of long training sequences, includes:

configuring the mapping rule between the access point (AP) and the long training sequence as that the AP selects an unused basic training sequence from the plurality of basic training sequences;

or, configuring the mapping rule between the access point (AP) and the long training sequence as that the AP selects at least two unused basic training sequences from the plurality of basic training sequences and selects a basic training sequence having worst relativity with a basic training sequence in use from the at least two unused basic training sequences;

or, configuring the mapping rule between the access point (AP) and the long training sequence as that when a number of STAs associated with the AP is greater than a number of shift training sequences corresponding to a basic training sequence, the AP selects at least one unused basic training sequence.

In combination with the third possible implementation manner of the first aspect, in the sixth possible implementation manner of the first aspect, the configuring the mapping rule between the access point (AP) in the wireless local area network environment and the long training sequence further includes: configuring the mapping rule between the access point (AP) and the long training sequence as that adjacent APs select different basic training sequences.

In combination with the third possible implementation manner of the first aspect, in the seventh possible implementation manner of the first aspect, the configuring the mapping rule between the station (STA) in the wireless local area network environment and the long training sequence includes:

configuring the mapping rule between the station (STA) and the long training sequence as that the STA selects a shift training sequence from shift training sequences generated from a basic training sequence corresponding to an AP associated with the STA as a long training sequence corresponding to the STA.

In combination with the seventh possible implementation manner of the first aspect, in the eighth possible implementation manner of the first aspect, the configuring the mapping rule between the station (STA) and the long training sequence as that the STA selects the shift training sequence from the shift training sequences generated from the basic training sequence corresponding to the AP associated with the STA as the long training sequence corresponding to the STA, includes:

configuring the mapping rule between the station (STA) and the long training sequence as that when the STA has a plurality of associated APs, the STA selects a shift training sequence from shift training sequences generated from a basic training sequence corresponding to a primary AP associated with the STA as the long training sequence corresponding to the STA.

In combination with the seventh possible implementation manner of the first aspect, in the ninth possible implementation manner of the first aspect, the configuring the mapping rule between the station (STA) and the long training sequence as that the STA selects the shift training sequence from the shift training sequences generated from the basic training sequence corresponding to the AP associated with the STA as the long training sequence corresponding to the STA, includes:

configuring the mapping rule between the station (STA) and the long training sequence as that the STA selects a shift training sequence having a maximum shift with a used shift training sequence from the shift training sequences generated from the basic training sequence corresponding to the AP associated with the STA as the long training sequence corresponding to the STA.

In combination with the third possible implementation manner of the first aspect, in the tenth possible implementation manner of the first aspect, an AP configures a long training sequence of an STA associated with the AP; or an STA selects a long training sequence.

In combination with the first aspect, in the eleventh possible implementation manner of the first aspect, the configuring the mapping rule between the terminal device and the long training sequence includes:

configuring the mapping rule between the terminal device and the long training sequence as that the terminal device selects a long training sequence from the plurality of long training sequences according to identity information of the terminal device as a long training sequence of the terminal device.

In combination with the eleventh possible implementation manner of the first aspect, in the twelfth possible implementation manner of the first aspect, the identity information of the terminal device includes any one of a media access control (MAC) address, an internet protocol (IP) address, a basic service set identifier (BSSID), associated identity information (AID), a mobile user cell phone number, an international mobile subscriber identity (IMSI) and an international mobile equipment identifier (IMEI).

In combination with the eleventh possible implementation manner of the first aspect, in the thirteenth possible implementation manner of the first aspect, the configuring the mapping rule between the terminal device and the long training sequence as that the terminal device selects the long training sequence from the plurality of long training sequences according to the identity information of the terminal device as the long training sequence of the terminal device, includes:

configuring the mapping rule between the terminal device and the long training sequence as that the terminal device generates a long training sequence identity according to the identity information of the terminal device, and selects a long training sequence corresponding to the long training sequence identity from the plurality of long training sequences as the long training sequence of the terminal device.

In a second aspect, a method for sending a signal is further provided, including:

obtaining, by a local device, a plurality of long training sequences, where the plurality of long training sequences include a plurality of basic training sequences and a plurality of shift training sequences obtained according to cyclic shift of the basic training sequences;

obtaining, by the local device, a mapping rule between a terminal device and a long training sequence;

selecting, by the local device, a long training sequence according to the mapping rule; and sending, by the local device, a signal according to the selected long training sequence.

In combination with the second aspect, in the first possible implementation manner of the second aspect, the sending the signal according to the selected long training sequence includes:

generating a long training symbol of the selected long training sequence on a frequency domain according to the selected long training sequence, a sequence length of the long training sequence and a number of system subcarriers; and sending the signal according to the long training symbol of the selected long training sequence on the frequency domain.

In combination with the first possible implementation manner of the second aspect, in the second possible implementation manner of the second aspect, the generating the long training symbol of the selected long training sequence on the frequency domain according to the selected long training sequence, the sequence length of the long training sequence and the number of the system subcarriers, includes:

when the number of the system subcarriers is greater than the sequence length of the long training sequence, setting a DC subcarrier in the system subcarriers as zero, selecting subcarriers in a number same as the sequence length of the long training sequence from non DC subcarriers in the system subcarriers, mapping elements in the long training sequence to the selected subcarriers, and interpolating a specific numerical value or a cyclic shift element of the long training sequence in a remaining non DC subcarrier in the system subcarriers to generate the long training symbol of the selected long training sequence on the frequency domain; or, when the number of the system subcarriers is equal to the sequence length of the long training sequence, mapping elements in the long training sequence to the system subcarriers, and setting a DC subcarrier in the system subcarriers as zero to generate the long training symbol of the selected long training sequence on the frequency domain; or, when the number of the system subcarriers is less than the sequence length of the long training sequence, selecting elements in the number of the system subcarriers from elements of the long training sequence, mapping the selected elements to the system subcarriers, and setting a DC subcarrier in the system subcarriers as zero to generate the long training symbol of the selected long training sequence on the frequency domain.

In combination with the second aspect, in the third possible implementation manner of the second aspect, the selecting the long training sequence according to the mapping rule includes:

when the local device is an AP, selecting, by the AP, an unused long training sequence from the plurality of long training sequences.

In combination with the third possible implementation manner of the second aspect, in the fourth possible implementation manner of the second aspect, when the local device is the AP, the selecting, by the AP, the unused long training sequence from the plurality of long training sequences, includes:

selecting an unused basic training sequence from the plurality of basic training sequences;

or, selecting at least two unused basic training sequences from the plurality of basic training sequences and selecting a basic training sequence having worst relativity with a basic training sequence in use from the at least two unused basic training sequences;

or, when a number of STAs associated with the AP is greater than a number of shift training sequences corresponding to a basic training sequence, selecting, by the AP, at least one unused basic training sequence.

In combination with the second aspect, in the fifth possible implementation manner of the second aspect, adjacent APs select different basic training sequences.

In combination with the second aspect, in the sixth possible implementation manner of the second aspect, the selecting the long training sequence according to the mapping rule includes:

when the local device is an STA, selecting a shift training sequence from shift training sequences generated from a basic training sequence corresponding to an AP associated with the STA.

In combination with the second aspect, in the seventh possible implementation manner of the second aspect, when the local device is the STA, the selecting the shift training sequence from the shift training sequences generated from the basic training sequence corresponding to the AP associated with the STA, includes:

when the local device has a plurality of associated APs, selecting a shift training sequence from shift training sequences generated from a basic training sequence corresponding to a primary AP associated with the local device.

In combination with the second aspect or the first possible implementation manner of the second aspect, in the eighth possible implementation manner of the second aspect, when the local device is the STA, the selecting the shift training sequence from the shift training sequences generated from the basic training sequence corresponding to the AP associated with the STA, includes:

selecting a shift training sequence having a maximum shift with a used shift training sequence from the shift training sequences generated from the basic training sequence corresponding to the AP associated with the local device.

In combination with the second aspect, in the ninth possible implementation manner of the second aspect, when the local device is an STA, the method further includes: receiving a long training sequence configured by an AP associated with the local device.

In combination with the second aspect, in the tenth possible implementation manner of the second aspect, the selecting the long training sequence according to the mapping rule includes:

generating a long training sequence identity according to identity information of the local device, and selecting a long training sequence corresponding to the long training sequence identity from the plurality of long training sequences.

In a third aspect, an apparatus for generating a long training sequence is provided, including:

a long training sequence obtaining module, configured to obtain a plurality of long training sequences according to a system parameter and a preset sequence construction formula, where the plurality of long training sequences include a plurality of basic training sequences and a plurality of shift training sequences obtained according to cyclic shift of the basic training sequences; and a mapping rule configuring module, configured to configure a mapping rule between a terminal device and a long training sequence, for enabling the terminal device to select a long training sequence according to the mapping rule as a long training sequence for sending a signal.

In combination with the third aspect, in the first possible implementation manner of the third aspect, the long training sequence obtaining module is configured to obtain a number of available subcarriers according to the system parameter; determine the preset sequence construction formula; determine a sequence length according to the number of the available subcarriers and the determined preset sequence construction formula; obtain the plurality of basic training sequences conforming to the sequence length according to the preset sequence construction formula and the determined sequence length; and perform cyclic shift on each basic training sequence in the plurality of basic training sequences to generate the plurality of shift training sequences.

In combination with the third aspect, in the second possible implementation manner of the third aspect, the apparatus further includes:

a long training symbol generating module, configured to generate long training symbols of the plurality of long training sequences on a frequency domain according to the plurality of long training sequences, a length of the long training sequence and a number of system subcarriers.

In combination with the third aspect, in the third possible implementation manner of the third aspect, the mapping rule configuring module includes:

a first configuring unit, configured to configure a mapping rule between an access point (AP) in a wireless local area network environment and the long training sequence; and/or, a second configuring unit, configured to configure a mapping rule between a station (STA) in a wireless local area network environment and the long training sequence.

In combination with the third possible implementation manner of the third aspect, in the fourth possible implementation manner of the third aspect, the first configuring unit is configured to configure the mapping rule between the access point (AP) and the long training sequence as that the AP selects an unused long training sequence from the plurality of long training sequences.

In combination with the fourth possible implementation manner of the third aspect, in the fifth possible implementation manner of the third aspect, the first configuring unit is configured to configure the mapping rule between the access point (AP) and the long training sequence as that the AP selects an unused basic training sequence from the plurality of basic training sequences;

or, the first configuring unit is configured to configure the mapping rule between the access point (AP) and the long training sequence as that the AP selects at least two unused basic training sequences from the plurality of basic training sequences and selects a basic training sequence having worst relativity with a basic training sequence in use from the at least two unused basic training sequences;

or, the first configuring unit is configured to configure the mapping rule between the access point (AP) and the long training sequence as that when a number of STAs associated with the AP is greater than a number of shift training sequences corresponding to a basic training sequence, the AP selects at least one unused basic training sequence.

In combination with the fourth possible implementation manner of the third aspect, in the sixth possible implementation manner of the third aspect, the mapping rule configuring module is configured to configure the mapping rule between the access point (AP) and the long training sequence as that adjacent APs select different basic training sequences.

In combination with the fourth possible implementation manner of the third aspect, in the seventh possible implementation manner of the third aspect, the second configuring unit is configured to configure the mapping rule between the station (STA) and the long training sequence as that the STA selects a shift training sequence from shift training sequences generated from a basic training sequence corresponding to an AP associated with the STA as a long training sequence corresponding to the STA.

In combination with the seventh possible implementation manner of the third aspect, in the eighth possible implementation manner of the third aspect, the second configuring unit is configured to configure the mapping rule between the station (STA) and the long training sequence as that when the STA has a plurality of associated APs, the STA selects a shift training sequence from shift training sequences generated from a basic training sequence corresponding to a primary AP associated with the STA as the long training sequence corresponding to the STA.

In combination with the seventh possible implementation manner of the third aspect, in the ninth possible implementation manner of the third aspect, the second configuring unit is configured to configure the mapping rule between the station (STA) and the long training sequence as that the STA selects a shift training sequence having a maximum shift with a used shift training sequence from the shift training sequences generated from the basic training sequence corresponding to the AP associated with the STA as the long training sequence corresponding to the STA.

In combination with the fourth possible implementation manner of the third aspect, in the tenth possible implementation manner of the third aspect, an AP configures a long training sequence of an STA associated with the AP; or an STA selects a long training sequence.

In combination with the fourth possible implementation manner of the third aspect, in the eleventh possible implementation manner of the third aspect, the mapping rule configuring module is configured to configure the mapping rule between the terminal device and the long training sequence as that the terminal device selects a long training sequence from the plurality of long training sequences according to identity information of the terminal device as a long training sequence corresponding to the terminal device.

In combination with the eleventh possible implementation manner of the third aspect, in the twelfth possible implementation manner of the third aspect, the identity information of the terminal device includes any one of a media access control (MAC) address, an internet protocol (IP) address, a basic service set identifier (BSSID), associated identity information (AID), a mobile user cell phone number, an international mobile subscriber identity (IMSI) and an international mobile equipment identifier (IMEI).

In combination with the eleventh or the twelfth possible implementation manner of the third aspect, in the thirteenth possible implementation manner of the third aspect, the mapping rule configuring module is configured to configure the mapping rule between the terminal device and the long training sequence as that the terminal device generates a long training sequence identity according to the identity information of the terminal device, and selects a long training sequence corresponding to the long training sequence identity from the plurality of long training sequences as the long training sequence corresponding to the terminal device.

In a fourth aspect, an apparatus for sending a signal is provided, including:

a long training sequence obtaining module, configured to obtain a plurality of long training sequences, where the plurality of long training sequences include a plurality of basic training sequences and a plurality of shift training sequences obtained according to cyclic shift of the basic training sequences;

a mapping rule obtaining module, configured to obtain a mapping rule between a terminal device and a long training sequence;

a long training sequence selecting module, configured to select a long training sequence according to the mapping rule; and a sending module, configured to send a signal according to the selected long training sequence.

In combination with the fourth aspect, in the first possible implementation manner of the fourth aspect, the sending module includes:

a long training symbol generating unit, configured to generate a long training symbol of the selected long training sequence on a frequency domain according to the selected long training sequence, a sequence length of the long training sequence and a number of system subcarriers; and a sending unit, configured to send the signal according to the long training symbol of the selected long training sequence on the frequency domain.

In combination with the fourth aspect, in the second possible implementation manner of the fourth aspect, the long training symbol generating unit is configured to, when the number of the system subcarriers is greater than the sequence length of the long training sequence, set a DC subcarrier in the system subcarriers as zero, select subcarriers in a number same as the sequence length of the long training sequence from non DC subcarriers in the system subcarriers, map elements in the long training sequence to the selected subcarriers, and interpolate a specific numerical value or a cyclic shift element of the long training sequence in a remaining non DC subcarrier in the system subcarriers to generate the long training symbol of the selected long training sequence on the frequency domain; or, the long training symbol generating unit is configured to, when the number of the system subcarriers is equal to the sequence length of the long training sequence, map elements in the long training sequence to the system subcarriers, and set a DC subcarrier in the system subcarriers as zero to generate the long training symbol of the selected long training sequence on the frequency domain; or, the long training symbol generating unit is configured to, when the number of the system subcarriers is less than the sequence length of the long training sequence, select elements in the number of the system subcarriers from elements of the long training sequence, map the selected elements to the system subcarriers, and set a DC subcarrier in the system subcarriers as zero to generate the long training symbol of the selected long training sequence on the frequency domain.

In combination with the fourth aspect, in the third possible implementation manner of the fourth aspect, the long training sequence selecting module is configured to select an unused long training sequence from the plurality of long training sequences, when the apparatus is located in an AP.

In combination with the third possible implementation manner of the fourth aspect, in the fourth possible implementation manner of the fourth aspect, selecting the unused long training sequence from the plurality of long training sequences, when the apparatus is located in the AP, includes:

selecting an unused basic training sequence from the plurality of basic training sequences;

or, selecting at least two unused basic training sequences from the plurality of basic training sequences and selecting a basic training sequence having worst relativity with a basic training sequence in use from the at least two unused basic training sequences;

or, when a number of STAs associated with the AP is greater than a number of shift training sequences corresponding to a basic training sequence, selecting, by the AP, at least one unused basic training sequence.

In combination with the fourth aspect, in the fifth possible implementation manner of the fourth aspect, adjacent APs select different basic training sequences.

In combination with the fourth aspect, in the sixth possible implementation manner of the fourth aspect, the long training sequence selecting module is configured to select a shift training sequence from shift training sequences generated from a basic training sequence corresponding to an AP associated with an STA, when the apparatus is located in the STA.

In combination with the fourth aspect, in the seventh possible implementation manner of the fourth aspect, the long training sequence selecting module is configured to select a shift training sequence from shift training sequences generated from a basic training sequence corresponding to a primary AP associated with an STA, when the apparatus is located in the STA and the STA in which the apparatus is located has a plurality of associated APs.

In combination with the third possible implementation manner of the fourth aspect, in the eighth possible implementation manner of the fourth aspect, the long training sequence selecting module is configured to select a shift training sequence having a maximum shift with a used shift training sequence from the shift training sequences generated from the basic training sequence corresponding to the AP associated with the STA in which the apparatus is located.

In combination with the fourth aspect, in the ninth possible implementation manner of the fourth aspect, when the apparatus is located in an STA, the apparatus further includes: a receiving module, configured to receive a long training sequence configured by an AP.

In combination with the fourth aspect, in the tenth possible implementation manner of the fourth aspect, the long training sequence selecting module is configured to generate a long training sequence identity according to identity information of a device in which the apparatus is located, and select a long training sequence corresponding to the long training sequence identity from the plurality of long training sequences.

The technical solutions provided by the present disclosure have the following beneficial effects:

by constructing a plurality of basic sequences and a plurality of shift sequences, a terminal device serving as a transmitting end selects the long training sequence according to the mapping rule for sending the signal, system interference may be reduced and accuracy of channel estimation may be improved.

BRIEF DESCRIPTION OF DRAWINGS

To illustrate technical solutions in embodiments of the present disclosure more clearly, a brief introduction on the accompanying drawings which are needed in the description of the embodiments is given below. Apparently, the accompanying drawings in the description below are merely some of the embodiments of the present disclosure, based on which other drawings may be obtained by those of ordinary skill in the art without any creative effort.

Definitions of abbreviations and key terms involved in the accompanying drawings are as follows:

GI Guard Interval guard interval

SIG Signal signal

HT High Throughput high throughput

Data data

GF Greenfield greenfield

STF Short Training Field short training field

VHT Very High Throughput very high throughput

STA Station station

AP Access Point access point

DESCRIPTION OF EMBODIMENTS

In order to make objectives, technical solutions and advantages of the present disclosure clearer, a further detailed description of embodiments of the present disclosure will be given below in combination with accompanying drawings.

Figure 1:
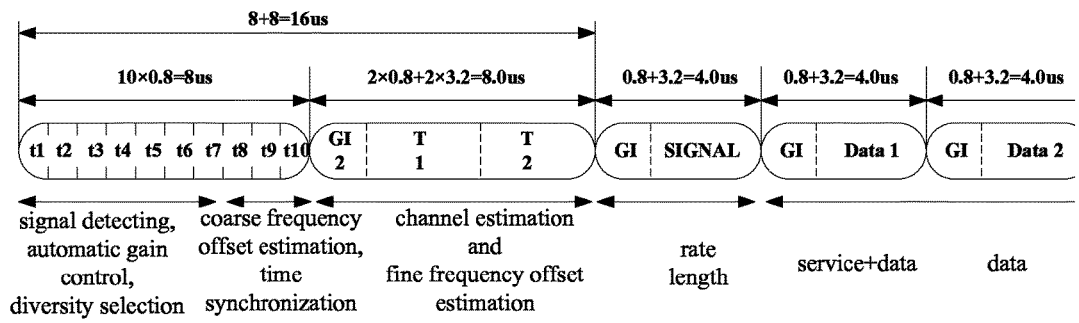
FIG. 1 is a schematic diagram of a structure of an OFDM training frame in 802.11g.
Figure 2:
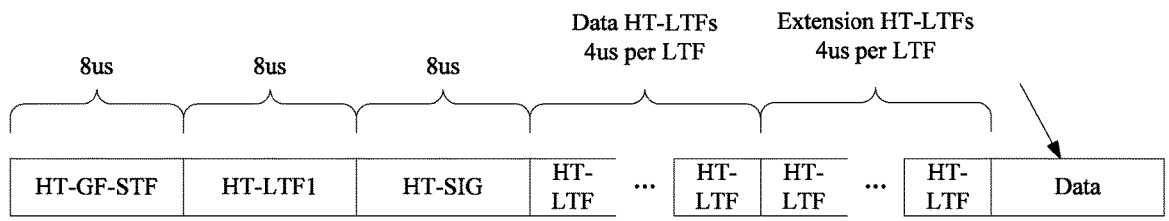
FIG. 2 is a schematic diagram of a structure of an OFDM training frame in 802.11n.
Figure 3:
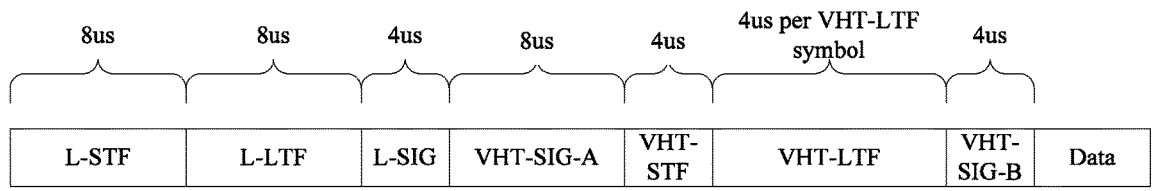
FIG. 3 is a schematic diagram of a structure of an OFDM training frame in 802.11ac.
Figure 4A:
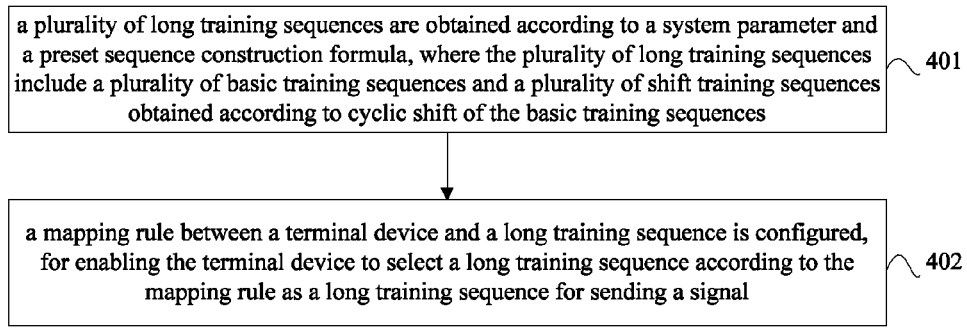
FIG. 4a is a flowchart of a method for generating a long training sequence provided by an embodiment of the present disclosure.

FIG. 4a is a flowchart of a method for generating a long training sequence provided by an embodiment of the present disclosure. Referring to FIG. 4a, the method includes:

401. a plurality of long training sequences are obtained according to a system parameter and a preset sequence construction formula, where the plurality of long training sequences include a plurality of basic training sequences and a plurality of shift training sequences obtained according to cyclic shift of the basic training sequences.

The system parameter refers to a parameter of a communication system, such as a system bandwidth. For example, in a 802.11n system, a CH_BANDWIDTH parameter may be obtained from TXVECTOR to obtain the system bandwidth. The preset sequence construction formula refers to a selected perfect sequence type, and a perfect sequence has a good correlation property, including a multi-phase perfect sequence such as a Zadoff-Chu sequence, a Frank sequence, a Combined Frank/Chu sequence or the like, or a Gold sequence, a Gold-Like sequence, an m sequence, etc.

402. A mapping rule between a terminal device and a long training sequence is configured, for enabling the terminal device to select a long training sequence according to the mapping rule as a long training sequence for sending a signal.

Configuring includes, but is not limited to, settings of the mapping rule. The terminal device may select the long training sequence according to the configured mapping rule. A configured executing device may configure the long training sequence used for sending for the terminal device according to the mapping rule. An executive body of specifically selecting a sequence is not limited in the embodiment of the present disclosure.

It should be noted that, the generating method may be executed by a transmitting end such as an AP (Access Point), an STA (Station) or the like, and may also be executed by an AC (Access Control), and is subsequently sent to other sending device in a communication system, for enabling the sending device to select a long training sequence from a plurality of long training sequences according to the mapping rule and generate a long training symbol on a frequency domain according to the selected long training sequence, and the sending device sends a signal according to the long training symbol on the frequency domain.

Optionally, after step 401, the method further includes: generating a long training symbol on a frequency domain according to the selected long training sequence, a length of the long training sequence and a number of system subcarriers.

After determining the preset sequence construction formula, a value range of the sequence length of the long training sequence may be determined, for example, any natural number or a square of any natural number, or the like, and a specific sequence length is determined according to the number of system subcarriers, and the number of system subcarriers may be obtained according to the system parameter.

For different systems, corresponding numbers of system subcarriers may be different, thus, it is needed that in a mapping process of the subcarriers, the subcarriers are mapped according to the sequence length of the long training sequence and the number of system subcarriers.

Step 403 further includes: performing inverse Fourier transform on the training symbol on the frequency domain to obtain a training signal on a time domain; performing periodic extension on the training signal on the time domain to obtain a cyclic prefix on the time domain, in order to improve a resisting interference capability of the system. The obtained cyclic prefix on the time domain is multiplied with a window function to generate a training sequence. Multiplying with the window function includes: multiplying with a time function according to a certain rule, to ensure better connection of signals at former and latter moments, for example, multiplying both a first symbol and a last symbol with 0.5, and then the last symbol of a former signal is added with the last symbol of a latter signal.

It should be noted that, a device used for executing the generating method may also be used for executing a generating process of a long training symbol, to generate a plurality of long training symbols of the plurality of long training sequences on the frequency domain. The long training symbols are subsequently sent to other sending device in the communication system after being generated, for enabling the sending device to select a long training symbol from the long training symbols corresponding to the plurality of long training sequences according to the mapping rule and send a signal according to the selected long training symbol.

According to the method provided by the embodiment of the present disclosure, by constructing a plurality of basic training sequences and a plurality of shift training sequences, a terminal device serving as a transmitting end selects the long training sequence according to the mapping rule, and a receiving end may identify the transmitting end on a physical layer by means of an excellent autocorrelation property and crosscorrelation property of the training sequence, instead of demodulating received signals one by one on an MAC layer to distinguish the transmitting end, and if a signal is not information needed by a local end, it may not be demodulated sequentially, thereby energy consumption of the receiving end is reduced. Since different long training sequences have almost ideal autocorrelation properties and excellent crosscorrelation properties, system interference may be reduced, and accuracy of channel estimation may be improved.

Optionally, the obtaining the plurality of long training sequences according to the system parameter and the preset sequence construction formula includes: obtaining a number of available subcarriers according to the system parameter; determining the preset sequence construction formula; determining a sequence length according to the number of the available subcarriers and the determined preset sequence construction formula; obtaining the plurality of basic training sequences conforming to the sequence length according to the preset sequence construction formula and the determined sequence length; and performing cyclic shift on each basic training sequence in the plurality of basic training sequences to generate the plurality of shift training sequences.

Optionally, after obtaining the plurality of long training sequences according to the system parameter and the preset sequence construction formula, the method further includes: generating long training symbols of the plurality of long training sequences on the frequency domain according to the plurality of long training sequences, a length of the long training sequence and a number of system subcarriers.

The "generating long training symbols of the plurality of long training sequences on the frequency domain according to the plurality of long training sequences, a length of the long training sequence and a number of system subcarriers" includes any one of the following conditions 403a-403c.

403a. when the number of the system subcarriers is greater than the sequence length of the long training sequence, a DC subcarrier in the system subcarriers is set as zero, subcarriers in a number same as the sequence length of the long training sequence are selected from non DC subcarriers in the system subcarriers, elements in the long training sequence are mapped to the selected subcarriers, and a specific numerical value or a cyclic shift element of the long training sequence are interpolated in a remaining non DC subcarrier in the system subcarriers to generate the long training symbol on the frequency domain.

Figure 4B:
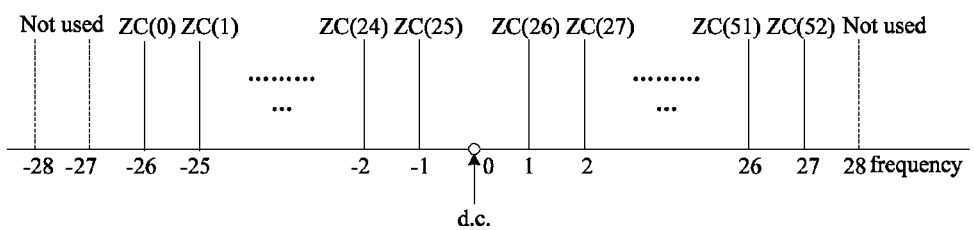
FIG. 4b is a schematic diagram of a mapping relationship between a sequence element and a subcarrier.

For example, as shown in FIG. 4b, 53 subcarriers are selected from the non DC subcarriers: subcarriers with serial numbers from "−26" to "−1" and serial numbers from "1" to "27", the elements in the long training sequence are mapped to the selected subcarriers one by one, and three non-zero subcarriers with serial numbers of "−28", "−27" and "28" are idle. When calculating a correlation function of the 53 subcarriers on the frequency domain, its curve is as shown in FIG. 4c, which has an ideal autocorrelation property and a good crosscorrelation property.

Figure 4C:
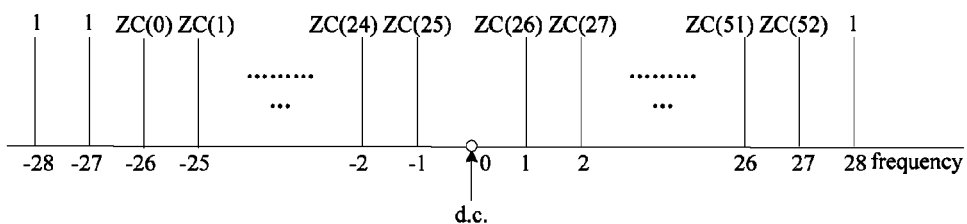
FIG. 4c is another schematic diagram of a mapping relationship between a sequence element and a subcarrier.
Figure 4D:
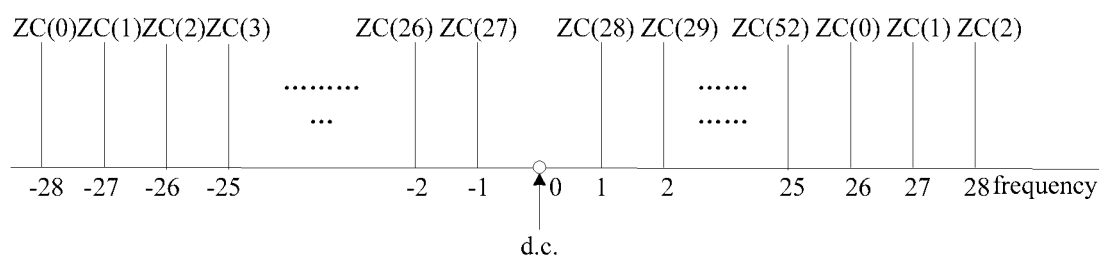
FIG. 4d is another schematic diagram of a mapping relationship between a sequence element and a subcarrier.

Or, as shown in FIG. 4c, 53 subcarriers are selected from the non DC subcarriers: subcarriers with serial numbers from "−26" to "−1" and serial numbers from "1" to "27", the elements in the long training sequence are mapped to the selected subcarriers one by one, as shown in FIG. 4d, and a numerical value "1" is sent by three non-zero subcarriers with serial numbers of "−28", "−27" and "28" for enabling the receiving end to perform channel estimation.

Or, as shown in FIG. 4d, 53 subcarriers are selected from the non DC subcarriers: subcarriers with serial numbers from "−28" to "−1" and serial numbers from "1" to "25". The elements in the long training sequence are mapped to the selected subcarriers one by one, and numerical values "ZC (0)", "ZC (1)" and "ZC (2)" are respectively sent by three non-zero subcarriers with serial numbers of "26", "27" and "28".

Figure 4E:
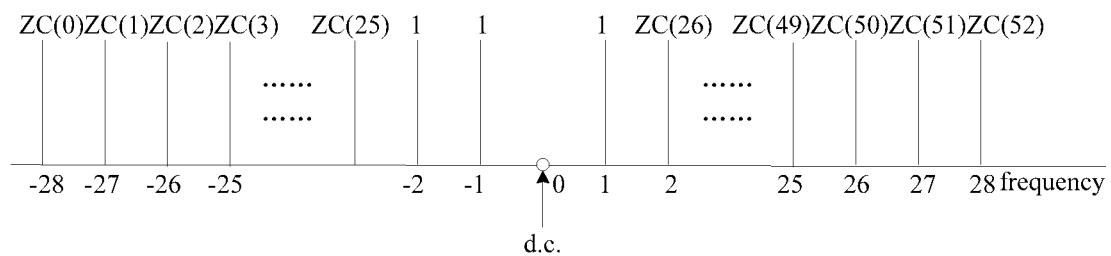
FIG. 4e is another schematic diagram of a mapping relationship between a sequence element and a subcarrier.

Or, as shown in FIG. 4e, 53 subcarriers are selected from the non DC subcarriers: subcarriers with serial numbers from "−28" to "−3" and serial numbers from "2" to "28", the elements in the long training sequence are mapped to the selected subcarriers one by one, and numerical values "1", "1" and "1" are respectively sent by three non-zero subcarriers with serial numbers of "−2", "−1" and "1".

The above-mentioned FIG. 4b to FIG. 4e are illustrated in a processing manner for that the system subcarriers have remaining subcarriers. The remaining subcarriers may be processed in any manner of being idle, and interpolating specific numerical values or cyclic shift elements of the long training sequence, and this is not limited in the embodiment of the present disclosure.

It should be noted that, when selecting the subcarriers, the remaining subcarriers are located at an edge or a center of the system bandwidth as much as possible, and the subcarriers are symmetrically selected as much as possible.

403b. When the number of the system subcarriers is equal to the sequence length of the long training sequence, elements in the long training sequence are mapped to the system subcarriers, and a DC subcarrier in the system subcarriers is set as zero to generate the long training symbol on the frequency domain;

403c. when the number of the system subcarriers is less than the sequence length of the long training sequence, elements in the number of the system subcarriers are selected from elements of the long training sequence, the selected elements are mapped to the system subcarriers, and a DC subcarrier in the system subcarriers is set as zero to generate the long training symbol on the frequency domain.

Optionally, configuring the mapping rule between the terminal device and the long training sequences includes:

configuring a mapping rule between an access point (AP) in a wireless local area network environment and the long training sequence; and/or, configuring a mapping rule between a station (STA) in a wireless local area network environment and the long training sequence.

Further optionally, the configuring the mapping rule between the access point (AP) in the wireless local area network environment and the long training sequence includes: configuring the mapping rule between the access point (AP) and the long training sequence as that the AP selects an unused long training sequence from the plurality of long training sequences.

Further optionally, the configuring the mapping rule between the access point (AP) and the long training sequence as that the AP selects the unused long training sequence from the plurality of long training sequences, includes:

configuring the mapping rule between the access point (AP) and the long training sequence as that the AP selects an unused basic training sequence from the plurality of basic training sequences; or, configuring the mapping rule between the access point (AP) and the long training sequence as that the AP selects at least two unused basic training sequences from the plurality of basic training sequences and selects a basic training sequence having worst relativity with a basic training sequence in use from the at least two unused basic training sequences; or, configuring the mapping rule between the access point (AP) and the long training sequence as that when a number of STAs associated with the AP is greater than a number of shift training sequences corresponding to a basic training sequence, the AP selects at least one unused basic training sequence.

Further optionally, the configuring the mapping rule between the access point (AP) in the wireless local area network environment and the long training sequence further includes: configuring the mapping rule between the access point (AP) and the long training sequence as that adjacent APs select different basic training sequences. Further optionally, the following conditions are included: different basic training sequences are selected for adjacent APs of the same operator; and/or, different basic training sequences are selected for adjacent APs of different operators.

Optionally, the configuring the mapping rule between the station (STA) in the wireless local area network environment and the long training sequence includes:

configuring the mapping rule between the station (STA) and the long training sequence as that the STA selects a shift training sequence from shift training sequences generated from a basic training sequence corresponding to an AP associated with the STA as a long training sequence corresponding to the STA.

Further optionally, the configuring the mapping rule between the station (STA) and the long training sequence as that the STA selects the shift training sequence from the shift training sequences generated from the basic training sequence corresponding to the AP associated with the STA as the long training sequence corresponding to the STA, includes:

configuring the mapping rule between the station (STA) and the long training sequence as that when the STA has a plurality of associated APs, the STA selects a shift training sequence from a shift training sequences generated from a basic training sequence corresponding to a primary AP associated with the STA as the long training sequence corresponding to the STA.

Further optionally, the configuring the mapping rule between the station (STA) and the long training sequence as that the STA selects the shift training sequence from the shift training sequences generated from the basic training sequence corresponding to the AP associated with the STA as the long training sequence corresponding to the STA, includes:

configuring the mapping rule between the station (STA) and the long training sequence as that the STA selects a shift training sequence having a maximum shift with a used shift training sequence from the shift training sequences generated from the basic training sequence corresponding to the AP associated with the STA as the long training sequence corresponding to the STA.

Optionally, an AP configures a long training sequence of an STA associated with the AP; or an STA selects a long training sequence.

Further optionally, configuring the mapping rule between the terminal device and the long training sequence includes: configuring the mapping rule between the terminal device and the long training sequence as that the terminal device selects a long training sequence from the plurality of long training sequences according to identity information of the terminal device as a long training sequence of the terminal device.

Further optionally, the configuring the mapping rule between the terminal device and the long training sequence as that the terminal device selects the long training sequence from the plurality of long training sequences according to the identity information of the terminal device as the long training sequence of the terminal device, includes: configuring the mapping rule between the terminal device and the long training sequence as that the terminal device generates a long training sequence identity according to the identity information of the terminal device, and selects a long training sequence corresponding to the long training sequence identity from the plurality of long training sequences as the long training sequence of the terminal device.

The identity information of the terminal device includes any one of a media access control (MAC) address, an internet protocol (IP) address, a basic service set identifier (BSSID), associated identity information (AID), a mobile user cell phone number, an international mobile subscriber identity (IMSI) and an international mobile equipment identifier (IMEI).

Figure 5:
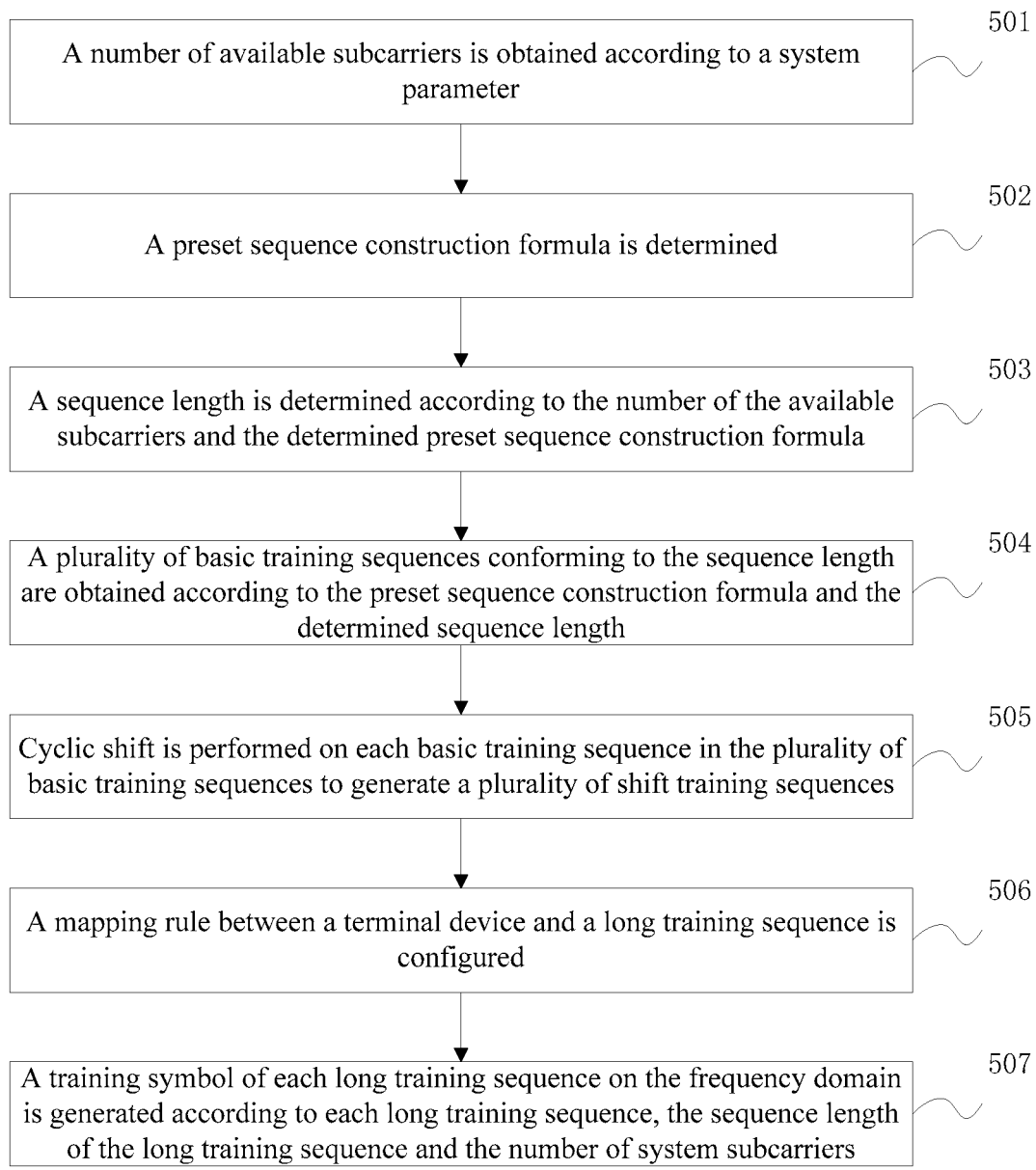
FIG. 5 is a flowchart of a method for generating a long training sequence provided by an embodiment of the present disclosure.

FIG. 5 is a flowchart of a method for generating a long training sequence provided by an embodiment of the present disclosure. Referring to FIG. 5, the embodiment specifically includes:

501. A number of available subcarriers are obtained according to a system parameter.

The number of available subcarriers may be obtained according to the system parameter. For example, in 802.11a and 802.11g, at a 20 MHz bandwidth, the number of available subcarriers is 53; in 802.11n and 802.11ac, at the 20 MHz bandwidth, the number of available subcarriers is 57.

502. A preset sequence construction formula is determined.

Specifically, a preset sequence construction formula is selected from a plurality of preset sequence construction formulas, for example, a Zadoff-Chu sequence is selected.

503. A sequence length is determined according to the number of the available subcarriers and the determined preset sequence construction formula.

For different numbers of the available subcarriers and preset sequence construction formulas, the determined sequence lengths may be different. If the Zadoff-Chu sequence is used, and when the number of the subcarriers is 53 or 57, the sequence length is set as 53. Since a number of sequences constructed according to the Zadoff-Chu sequence is determined by the sequence length, the number of sequences is a natural number less than the sequence length and relatively prime to the sequence length. Therefore when the Zadoff-Chu sequence is selected, the determined sequence length is a maximum prime number less than or equal to the number of the available subcarriers. In this way, the long training sequences are generated as much as possible, and cognate sequences (shift training sequences) thereof are also as much as possible.

For example, for a Wi-Fi system using an IEEE 802.11n standard, the number of available subcarriers is 57, when the selected preset sequence construction formula is the Zadoff-Chu sequence, the sequence length may be determined as 53, because 53 is a maximum prime number less than or equal to 57.

504. A plurality of basic training sequences conforming to the sequence length are obtained according to the preset sequence construction formula and the determined sequence length.

505. Cyclic shift is performed on each basic training sequence in the plurality of basic training sequences to generate a plurality of shift training sequences.

Cyclic shift is performed on each obtained basic training sequence, of which all cyclic shift sequences are found out, and the plurality of basic training sequences and the shift training sequences obtained by performing the cyclic shift on the plurality of basic training sequences form the plurality of long training sequences in the embodiment of the present disclosure.

A cyclic shift element, namely a cyclic shift interval, used during the cyclic shift may be set by a technicist, and this is not limited in the embodiment of the present disclosure.

506. A mapping rule between a terminal device and a long training sequence is configured.

The mapping rule between the terminal device and the long training sequence is used for enabling the terminal device to use a long training sequence different from other terminal devices to send a signal, so that a receiving end analyzes a training sequence included in a received data packet on a physical layer to obtain the terminal device sending the data packet, so as to distinguish different transmitting ends.

It should be noted that, the configuring may mean setting the mapping rule, and the configuring may also include sending the mapping rule to various sending devices and receiving devices in a communication system after setting the mapping rule.

The terminal device of the communication system includes, but is not limited to, an access point (AP) and a station (STA), correspondingly, in order to reduce interference in the system as much as possible to improve throughput of the system, the configuring the mapping rule between the terminal device and the long training sequence includes: (A) configuring a mapping rule between an access point (AP) in a wireless local area network environment and the long training sequence; (B) configuring a mapping rule between a station (STA) in a wireless local area network environment and the long training sequence.

(A) "configuring a mapping rule between an access point (AP) in a wireless local area network environment and the long training sequence" includes: configuring the mapping rule between the access point (AP) and the long training sequence as that the AP selects an unused long training sequence from the plurality of long training sequences. A use state of the long training sequence includes unused and used, used refers to that the long training sequence has been allocated to a certain terminal device, while unused refers to that the long training sequence is not allocated.

Further optionally, the configuring the mapping rule between the access point (AP) and the long training sequence as that the AP selects the unused long training sequence from the plurality of long training sequences may adopt any one of the following manners:

(A1) configuring the mapping rule between the access point (AP) and the long training sequence as that the AP selects an unused basic training sequence from the plurality of basic training sequences.

(A2) configuring the mapping rule between the access point (AP) and the long training sequence as that the AP selects at least two unused basic training sequences from the plurality of basic training sequences and selects a basic training sequence having worst relativity with a basic training sequence in use from the at least two unused basic training sequences.

The basic training sequence having the worst relativity with the basic training sequence in use refers to the basic training sequence having a minimum correlation function value amplitude with the basic training sequence in use.

(A3) configuring the mapping rule between the access point (AP) and the long training sequence as that when a number of STAs associated with the AP is greater than a number of shift training sequences corresponding to a basic training sequence, the AP selects at least one unused basic training sequence.

If the number of STAs associated with the AP is greater, and shift training sequences of one basic training sequence may not satisfy requirements of all the STAs, then the AP may select two or more basic training sequences and allocate shift training sequences generated from the two or more basic training sequences to the STAs associated with the AP.

It should be noted that, selecting may not be performed within a same time, this is, with increase of the number of STAs associated with the AP, the AP may further select one or more basic training sequences based on the selected basic training sequence, in order to satisfy requirements of the number of the STAs.

In the above-mentioned (A1)-(A3), for the AP, in order to make the long training sequence used by the AP correspond to that used by the STA associated with the AP, the AP may select an unused basic training sequence from the plurality of basic training sequences, or a configuration device selects an unused basic training sequence from the plurality of basic training sequences for the AP.

Further optionally, the configuring the mapping rule between the access point (AP) in the wireless local area network environment and the long training sequence further includes: configuring the mapping rule between the access point (AP) and the long training sequence as that adjacent APs select different basic training sequences. Specifically, different basic training sequences are selected for adjacent APs of a same operator; and/or, different basic training sequences are selected for adjacent APs of different operators. For the adjacent APs of the same operator, selection may be coordinated by an upper level controller of the APs, and selected basic training sequences are sent to the APs, or it is achieved by a subsequently accessed AP scanning the adjacent APs. For the adjacent APs of different operators, the APs or upper level controllers of the APs may negotiate in an air interface negotiation manner.

Optionally, (B) "configuring a mapping rule between a station (STA) in a wireless local area network environment and the long training sequence" includes: configuring the mapping rule between the station (STA) and the long training sequence as that the STA selects a shift training sequence from shift training sequences generated from a basic training sequence corresponding to an AP associated with the STA as a long training sequence corresponding to the STA. Since a shift training sequences is generated by performing cyclic shift on a basic training sequence, for shift training sequences generated from a same basic training sequence, autocorrelation properties and crosscorrelation properties are good, and autocorrelation properties and crosscorrelation properties of the basic training sequence and the shift training sequences generated from the basic training sequence are good. Therefore, the AP associated with the STA may send the basic training sequence configured by the AP to the STA, for enabling the STA to select a shift training sequence generated from the basic training sequence from the plurality of long training sequences, or the AP selects a shift training sequence from the shift training sequences generated from the basic training sequence and sends it to the STA.

Further optionally, the configuring the mapping rule between the station (STA) and the long training sequence as that the STA selects the shift training sequence from the shift training sequences generated from the basic training sequence corresponding to the AP associated with the STA as the long training sequence corresponding to the STA includes: configuring the mapping rule between the station (STA) and the long training sequence as that when the STA has a plurality of associated APs, the STA selects a shift training sequence from shift training sequences generated from a basic training sequence corresponding to a primary AP associated with the STA as the long training sequence corresponding to the STA. If the STA has a plurality of associated APs, the plurality of associated APs has a primary-secondary relationship, and selecting is performed according to the basic training sequence of the primary AP.

Further optionally, configuring the mapping rule between the station (STA) and the long training sequence as that the STA selects the shift training sequence from the shift training sequences generated from the basic training sequence corresponding to the AP associated with the STA as the long training sequence corresponding to the STA, includes:

configuring the mapping rule between the station (STA) and the long training sequence as that the STA selects a shift training sequence having a maximum shift with a used shift training sequence from the shift training sequences generated from the basic training sequence corresponding to the AP associated with the STA as the long training sequence corresponding to the STA.

For example, if the sequence length is 53, sequence shift selected by the AP is 0, and the shift training sequences generated from the basic training sequence selected by the AP are all unused, then a first STA may select a sequence with a shift of 26, a second STA may select a sequence with a shift of 39, a third STA may select a sequence with a shift of 13, and so on.

Optionally, an AP configures a long training sequence of an STA associated with the AP; or an STA selects a long training sequence. In a configuration process, what is transmitted may not be the long training sequence, but a number or an identity used for identifying the long training sequence.

Further optionally, configuring the mapping rule between the terminal device and the long training sequence includes:

configuring the mapping rule between the terminal device and the long training sequence as that the terminal device selects a long training sequence from the plurality of long training sequences according to identity information of the terminal device as a long training sequence of the terminal device.

Further optionally, the configuring the mapping rule between the terminal device and the long training sequence as that the terminal device selects the long training sequence from the plurality of long training sequences according to the identity information of the terminal device as the long training sequence of the terminal device, includes:

configuring the mapping rule between the terminal device and the long training sequence as that the terminal device generates a long training sequence identity according to the identity information of the terminal device, and selects a long training sequence corresponding to the long training sequence identity from the plurality of long training sequences as the long training sequence of the terminal device.

The identity information of the terminal device includes any one of a media access control (MAC) address, an internet protocol (IP) address, a basic service set identifier (BSSID), associated identity information (AID), a mobile user cell phone number, an international mobile subscriber identity (IMSI) and an international mobile equipment identifier (IMEI).

For example, 11 bits (for example, b0 to b10 bits in a MAC address, namely former 11 bits of PSN, which may be used for identifying $2^{11}=2048$ devices) may be selected from the MAC address of the transmitting end, to determine a mapping relationship between each long training sequence and each first sub-identity information. For example, the 11 bits of binary bits may be converted into a digit A of decimal, and a long training sequence with a sequence ID of A is selected to correspond to the transmitting end.

As another example, 24 bits (for example, b0 to b23 bits in the MAC address, namely all of the PSN, which may be used for identifying 224 devices) may be selected from the MAC address, the 24 bits of binary first sub-identity information may be converted into a digit of decimal, and modulo processing is performed on the digit of the converted first sub-identity information to a preset digit (for example, the number of the long training sequences). A digit after the modulo processing is A, and a long training sequence with a sequence ID of A is selected to correspond to the transmitting end.

As another example, 22 bits from b0 to b21 may be selected from the MAC address, and then an operation rule is set, for example, c(i)=b(2i) XOR b(2i+1), i=0, 1, . . . , 10, in order to generate 11 bits; or 24 bits from b0 to b23 may be selected from the MAC address, and then an operation rule is set, for example, c(i)=b(2i) XOR b(2i+1), i=0, 1, . . . , 8, c(9)=b(18)+b(19)+b(20), c(10)=b(21)+b(22)+b(23), in order to generate 11 bits. Then, a mapping relationship between the transmitting end and the long training sequence is determined according to these 11 bits. For example, the 11 bits of binary bits may be converted into a digit A of decimal, and a long training sequence with a sequence ID of A is selected to correspond to the transmitting end.

507. A training symbol of each long training sequence on the frequency domain is generated according to each long training sequence, the sequence length of the long training sequence and the number of system subcarriers.

Optionally, generating the training symbol of each long training sequence on the frequency domain according to each long training sequence, the sequence length of the long training sequence and the number of system subcarriers, includes: when the number of the system subcarriers is greater than the sequence length of the long training sequence, setting a DC subcarrier in the system subcarriers as zero, selecting subcarriers in a number same as the sequence length of the long training sequence from non DC subcarriers in the system subcarriers, mapping elements in the long training sequence to the selected subcarriers, and interpolating a specific numerical value or a cyclic shift element of the long training sequence in a remaining non DC subcarrier in the system subcarriers to generate the training symbol of each selected long training sequence on the frequency domain; or, when the number of the system subcarriers is equal to the sequence length of the long training sequence, mapping elements in the long training sequence to the system subcarriers, and setting a DC subcarrier in the system subcarriers as zero to generate the training symbol of each long training sequence on the frequency domain; or, when the number of the system subcarriers is less than the sequence length of the long training sequence, selecting elements in the number of the system subcarriers from elements of the long training sequence, mapping the selected elements to the system subcarriers, and setting a DC subcarrier in the system subcarriers as zero to generate the training symbol of each long training sequence on the frequency domain.

Further, a transmitting end device selects a long training sequence from the plurality of long training sequences as a long training sequence used for sending a signal. Processing on the long training sequence when sending the signal is not repeated redundantly in the embodiment of the present disclosure.

It should be noted that, in an existing IEEE 802.11n standard, a system bandwidth includes 20 MHz and 40 MHz. For compatibility and uniformity of a system, a long training sequence set under 40 MHz may be generated by a long training sequence set under 20 MHz. For example, the Zadoff-Chu sequence with the length of 53 is still used, or a sequence is regenerated according to the foregoing method, for example, a Zadoff-Chu sequence with a length of 113 is selected. In other standards, in a case of a plurality of bandwidths, processing may be performed in the same method, and a long training sequence set under a high bandwidth may be either generated by a long training sequence set under a low bandwidth or regenerated according to the foregoing method.

In addition, it should be noted that, the embodiment of the present disclosure is only illustrated by configuring the mapping relationship between the long training sequence and the terminal device. Actually, in a practical application scenario, after the mapping relationship between the long training sequence and the terminal device is configured, a mapping relationship between a training sequence generated from the long training sequence and the terminal device may be directly determined. When configuration received by the terminal device is training sequences generated according to a plurality of long training sequences, a training sequence used for sending a signal may be selected according to the mapping relationship between the training sequence and the terminal device, and it will not be repeated redundantly in the embodiment of the present disclosure.

An executive body of the embodiment of the present disclosure is an apparatus for generating a training sequence, and the apparatus may be located in a terminal device, a controller or a base station.

By constructing a plurality of basic training sequences and a plurality of shift training sequences, the terminal device serving as the transmitting end selects the long training sequence according to the mapping rule for sending the signal, the receiving end may identify the transmitting end on a physical layer by means of an excellent autocorrelation property and crosscorrelation property of the training sequence, instead of demodulating received signals one by one on an MAC layer to distinguish the transmitting end, and if a signal is not information needed by a local end, it may not be demodulated sequentially, thereby energy consumption of the receiving end is reduced. Since different long training sequences have almost ideal autocorrelation properties and excellent crosscorrelation properties, system interference may be reduced, and accuracy of channel estimation may be improved. Further, the basic training sequences and the shift training sequences are introduced in the embodiment of the present disclosure, such that different APs and STAs use different sequences when sending signals, and the receiving end may identify the transmitting end in an LTF.

For convenience of illustration, an example of generating a training sequence is illustrated below.

At first, a system bandwidth 20 MHz is obtained, it may be obtained according to the system bandwidth that a number of available subcarriers is 53, and selected sequence construction formula is a Zadoff-Chu sequence, and the sequence construction formula is shown in formula (1).

$$\hat{a}_n^{(r)} = \begin{cases} e^{\frac{i\pi}{N}r(n+1)n}, & N \text{ is an odd number,} \\ e^{\frac{i\pi}{N}rn^2}, & N \text{ is an even number,} \end{cases} \quad 0 \le n < N; \quad (1)$$

$$gcd(r, N) = 1$$

$\hat{a}_n^{(r)}$ refers to a $n^{th}$ element in a long training sequence $\hat{a}^{(r)}$, and N refers to a sequence length.

$$C=\{\hat{a}^{(1)}, \ldots, \hat{a}^{(r)}, \ldots, \hat{a}^{(52)}\}, r=\{1,2,\ldots,52\}$$

$\hat{a}(r)=(\hat{a}_0^{(r)}, \hat{a}_1^{(r)}, \ldots, \hat{a}_{52}^{(r)})$; C refers to a basic training sequence set including a plurality of basic training sequences.

Then, the sequence length is determined as 53 according to the number of the available subcarriers and the determined preset sequence construction formula, and a plurality of basic training sequences confirming to the sequence length are determined according to the preset sequence construction formula and the determined sequence length. In the example, the number of the plurality of basic training sequences confirming to the sequence length is 52, the sequence length is 53, and a set of the plurality of basic training sequences is shown as follows:

a(1)={0 2 6 12 20 30 42 56 72 90 4 26 50 76 104 28 60 94 24 62 102 38 82 22 70 14 66 14 70 22 82 38 102 62 24 94 60 28 104 76 50 26 4 90 72 56 42 30 20 12 6 2 0} a(2)={0 4 12 24 40 60 84 6 38 74 8 52 100 46 102 56 14 82 48 18 98 76 58 44 34 28 26 28 34 44 58 76 98 18 48 82 14 56 102 46 100 52 8 74 38 6 84 60 40 24 12 4 0} a(3)={0 6 18 36 60 90 20 62 4 58 12 78 44 16 100 84 74 70 72 80 94 8 34 66 104 42 92 42 104 66 34 8 94 80 72 70 74 84 100 16 44 78 12 58 4 62 20 90 60 36 18 6 0} a(4)={0 8 24 48 80 14 62 12 76 42 16 104 94 92 98 6 28 58 96 36 90 46 10 88 68 56 52 56 68 88 10 46 90 36 96 58 28 6 98 92 94 104 16 42 76 12 62 14 80 48 24 8 0} a(5)={0 10 30 60 100 44 104 68 42 26 20 24 38 62 96 34 88 46 14 98 86 84 92 4 32 70 12 70 32 4 92 84 86 98 14 46 88 34 96 62 38 24 20 26 42 68 104 44 100 60 30 10 0} a(6)={0 12 36 72 14 74 40 18 8 10 24 50 88 32 94 62 42 34 38 54 82 16 68 26 102 84 78 84 102 26 68 16 82 54 38 34 42 62 94 32 88 50 24 10 8 18 40 74 14 72 36 12 0} a(7)={0 14 42 84 34 104 82 74 80 100 28 76 32 2 92 90 102 22 62 10 78 54 44 48 66 98 38 98 66 48 44 54 78 10 62 22 102 90 92 2 32 76 28 100 80 74 82 104 34 84 42 14 0} a(8)={0 16 48 96 54 28 18 24 46 84 32 102 82 78 90 12 56 10 86 72 74 92 20 70 30 6 104 6 30 70 20 92 74 72 86 10 56 12 90 78 82 102 32 84 46 24 18 28 54 96 48 16 0} a(9)={0 18 54 2 74 58 60 80 12 68 36 22 26 48 88 40 10 104 4 28 70 24 102 92 100 20 64 20 100 92 102 24 70 28 4 104 10 40 88 48 26 22 36 68 12 80 60 58 74 2 54 18 0} a(10)={0 20 60 14 94 88 102 30 84 52 40 48 76 18 86 68 70 92 28 90 66 62 78 8 64 34 24 34 64 8 78 62 66 90 28 92 70 68 86 18 76 48 40 52 84 30 102 88 94 14 60 20 0} a(11)={0 22 66 26 8 12 38 86 50 36 44 74 20 94 84 96 24 80 52 46 62 100 54 30 28 48 90 48 28 30 54 100 62 46 52 80 24 96 84 94 20 74 44 36 50 86 38 12 8 26 66 22 0} a(12)={0 24 72 38 28 42 80 36 16 20 48 100 70 64 82 18 84 68 76 2 58 32 30 52 98 62 50 62 98 52 30 32 58 2 76 68 84 18 82 64 70 100 48 20 16 36 80 42 28 38 72 24 0} a(13)={0 26 78 50 48 72 16 92 88 4 52 20 14 34 80 46 38 56 100 64 54 70 6 74 62 76 10 76 62 74 6 70 54 64 100 56 38 46 80 34 14 20 52 4 88 92 16 72 48 50 78 26 0} a(14)={0 28 84 62 68 102 58 42 54 94 56 46 64 4 78 74 98 44 18 20 50 2 88 96 26 90 76 90 26 96 88 2 50 20 18 44 98 74 78 4 64 46 56 94 54 42 58 102 68 62 84 28 0} a(15)={0 30 90 74 88 26 100 98 20 78 60 72 8 80 76 102 52 32 42 82 46 40 64 12 96 104 36 104 96 12 64 40 46 82 42 32 52 102 76 80 8 72 60 78 20 98 100 26 88 74 90 30 0} a(16)={0 32 96 86 2 56 36 48 92 62 64 98 58 50 74 24 6 20 66 38 42 78 40 34 60 12 102 12 60 34 40 78 42 38 66 20 6 24 74 50 58 98 64 62 92 48 36 56 2 86 96 32 0} a(17)={0 34 102 98 22 86 78 104 58 46 68 18 2 20 72 52 66 8 90 100 38 10 16 56 24 26 62 24 56 16 10 38 100 90 8 66 52 72 20 2 18 68 46 58 104 78 86 22 98 102 34 0} a(18)={0 36 2 4 42 10 14 54 24 30 72 44 52 96 70 80 20 102 8 56 34 48 98 78 94 40 22 40 94 78 98 48 34 56 8 102 20 80 70 96 52 44 72 30 24 54 14 10 42 4 2 36 0} a(19)={0 38 8 16 62 40 56 4 96 14 76 70 102 66 68 2 80 90 32 12 30 86 74 100 58 54 88 54 58 100 74 86 30 12 32 90 80 2 68 66 102 70 76 14 96 4 56 40 62 16 8 38 0} a(20)={0 40 14 28 82 70 98 60 62 104 80 96 46 36 66 30 34 78 56 74 26 18 50 16 22 68 48 68 22 16 50 18 26 74 56 78 34 30 66 36 46 96 80 104 62 60 98 70 82 28 14 40 0} a(21)={0 42 20 40 102 100 34 10 28 88 84 16 96 6 64 58 94 66 80 30 22 56 26 38 92 82 8 82 92 38 26 56 22 30 80 66 94 58 64 6 96 16 84 88 28 10 34 100 102 40 20 42 0} a(22)={0 44 26 52 16 24 76 66 100 72 88 42 40 82 62 86 48 54 104 92 18 94 2 60 56 96 74 96 56 60 2 94 18 92 104 54 48 86 62 82 40 42 88 72 100 66 76 24 16 52 26 44 0} a(23)={0 46 32 64 36 54 12 16 66 56 92 68 90 52 60 8 2 42 22 48 14 26 84 82 20 4 34 4 20 82 84 26 14 48 22 42 2 8 60 52 90 68 92 56 66 16 12 54 36 64 32 46 0} a(24)={0 48 38 76 56 84 54 72 32 40 96 94 34 22 58 36 62 30 46 4 10 64 60 104 90 18 100 18 90 104 60 64 10 4 46 30 62 36 58 22 34 94 96 40 32 72 54 84 56 76 38 48 0} a(25)={0 50 44 88 76 8 96 22 104 24 100 14 84 98 56 64 16 18 70 66 6 102 36 20 54 32 60 32 54 20 36 102 6 66 70 18 16 64 56 98 84 14 100 24 104 22 96 8 76 88 44 50 0} a(26)={0 52 50 100 96 38 32 78 70 8 104 40 28 68 54 92 76 6 94 22 2 34 12 42 18 46 20 46 18 42 12 34 2 22 94 6 76 92 54 68 28 40 104 8 70 78 32 38 96 100 50 52 0} a(27)={0 54 56 6 10 68 74 28 36 98 2 66 78 38 52 14 30 100 12 84 104 72 94 64 88 60 86 60 88 64 94 72 104 84 12 100 30 14 52 38 78 66 2 98 36 28 74 68 10 6 56 54 0} a(28)={0 56 62 18 30 98 10 84 2 82 6 92 22 8 50 42 90 88 36 40 100 4 70 86 52 74 46 74 52 86 70 4 100 40 36 88 90 42 50 8 22 92 6 82 2 84 10 98 30 18 62 56 0} a(29)={0 58 68 30 50 22 52 34 74 66 10 12 72 84 48 70 44 76 60 102 96 42 46 2 16 88 6 88 16 2 46 42 96 102 60 76 44 70 48 84 72 12 10 66 74 34 52 22 50 30 68 58 0} a(30)={0 60 74 42 70 52 94 90 40 50 14 38 16 54 46 98 104 64 84 58 92 80 22 24 86 102 72 102 86 24 22 80 92 58 84 64 104 98 46 54 16 38 14 50 40 90 94 52 70 42 74 60 0} a(31)={0 62 80 54 90 82 30 40 6 34 18 64 66 24 44 20 58 52 2 14 88 12 104 46 50 10 32 10 50 46 104 12 88 14 2 52 58 20 44 24 66 64 18 34 6 40 30 82 90 54 80 62 0} a(32)={0 64 86 66 4 6 72 96 78 18 22 90 10 100 42 48 12 40 26 76 84 50 80 68 14 24 98 24 14 68 80 50 84 76 26 40 12 48 42 100 10 90 22 18 78 96 72 6 4 66 86 64 0} a(33)={0 66 92 78 24 36 8 46 44 2 26 10 60 70 40 76 72 28 50 32 80 88 56 90 84 38 58 38 84 90 56 88 80 32 50 28 72 76 40 70 60 10 26 2 44 46 8 36 24 78 92 66 0} a(34)={0 68 98 90 44 66 50 102 10 92 30 36 4 40 38 104 26 16 74 94 76 20 32 6 48 52 18 52 48 6 32 20 76 94 74 16 26 104 38 40 4 36 30 92 10 102 50 66 44 90 98 68 0} a(35)={0 70 104 102 64 96 92 52 82 76 34 62 54 10 36 26 86 4 98 50 72 58 8 28 12 66 84 66 12 28 8 58 72 50 98 4 86 26 36 10 54 62 34 76 82 52 92 96 64 102 104 70 0} a(36)={0 72 4 8 84 20 28 2 48 60 38 88 104 86 34 54 40 98 16 6 68 96 90 50 82 80 44 80 82 50 90 96 68 6 16 98 40 54 34 86 104 88 38 60 48 2 28 20 84 8 4 72 0} a(37)={0 74 10 20 104 50 70 58 14 44 42 8 48 56 32 82 100 86 40 68 64 28 66 72 46 94 4 94 46 72 66 28 64 68 40 86 100 82 32 56 48 8 42 44 14 58 70 50 104 20 10 74 0} a(38)={0 76 16 32 18 80 6 8 86 28 46 34 98 26 30 4 54 74 64 24 60 66 42 94 10 2 70 2 10 94 42 66 60 24 64 74 54 4 30 26 98 34 46 28 86 8 6 80 18 32 16 76 0} a(39)={0 78 22 44 38 4 48 64 52 12 50 60 42 102 28 32 8 62 88 86 56 104 18 10 80 16 30 16 80 10 18 104 56 86 88 62 8 32 28 102 42 60 50 12 52 64 48 4 38 44 22 78 0} a(40)={0 80 28 56 58 34 90 14 18 102 54 86 92 72 26 60 68 50 6 42 52 36 100 32 44 30 96 30 44 32 100 36 52 42 6 50 68 60 26 72 92 86 54 102 18 14 90 34 58 56 28 80 0} a(41)={0 82 34 68 78 64 26 70 90 86 58 6 36 42 24 88 22 38 30 104 48 74 76 54 8 44 56 44 8 54 76 74 48 104 30 38 22 88 24 42 36 6 58 86 90 70 26 64 78 68 34 82 0} a(42)={0 84 40 80 98 94 68 20 56 70 62 32 86 12 22 10 82 26 54 60 44 6 52 76 78 58 16 58 78 76 52 6 44 60 54 26 82 10 22 12 86 32 62 70 56 20 68 94 98 80 40 84 0} a(43)={0 86 46 92 12 18 4 76 22 54 66 58 30 88 20 38 36 14 78 16 40 44 28 98 42 72 82 72 42 98 28 44 40 16 78 14 36 38 20 88 30 58 66 54 22 76 4 18 12 92 46 86 0} a(44)={0 88 52 104 32 48 46 26 94 38 70 84 80 58 18 66 96 2 102 78 36 82 4 14 6 86 42 86 6 14 4 82 36 78 102 2 96 66 18 58 80 84 70 38 94 26 46 48 32 104 52 88 0} a(45)={0 90 58 10 52 78 88 82 60 22 74 4 24 28 16 94 50 96 20 34 32 14 86 36 76 100 2 100 76 36 86 14 32 34 20 96 50 94 16 28 24 4 74 22 60 82 88 78 52 10 58 90 0} a(46)={0 92 64 22 72 2 24 32 26 6 78 30 74 104 14 16 4 84 44 96 28 52 62 58 40 8 68 8 40 58 62 52 28 96 44 84 4 16 14 104 74 30 78 6 26 32 24 2 72 22 64 92 0} a(47)={0 94 70 34 92 32 66 88 98 96 82 56 18 74 12 44 64 72 68 52 24 90 38 80 4 22 28 22 4 80 38 90 24 52 68 72 64 44 12 74 18 56 82 96 98 88 66 32 92 34 70 94 0} a(48)={0 96 76 46 6 62 2 38 64 80 86 82 68 44 10 72 18 60 92 8 20 22 14 102 74 36 94 36 74 102 14 22 20 8 92 60 18 72 10 44 68 82 86 80 64 38 2 62 6 46 76 96 0} a(49)={0 98 82 58 26 92 44 94 30 64 90 2 12 14 8 100 78 48 10 70 16 60 96 18 38 50 54 50 38 18 96 60 16 70 10 48 78 100 8 14 12 2 90 64 30 94 44 92 26 58 82 98 0} a(50)={0 100 88 70 46 16 86 44 102 48 94 28 62 90 6 22 32 36 34 26 12 98 72 40 2 64 14 64 2 40 72 98 12 26 34 36 32 22 6 90 62 28 94 48 102 44 86 16 46 70 88 100 0} a(51)={0 102 94 82 66 46 22 100 68 32 98 54 6 60 4 50 92 24 58 88 8 30 48 62 72 78 80 78 72 62 48 30 8 88 58 24 92 50 4 60 6 54 98 32 68 100 22 46 66 82 94 102 0} a(52)={0 104 100 94 86 76 64 50 34 16 102 80 56 30 2 78 46 12 82 44 4 68 24 84 36 92 40 92 36 84 24 68 4 44 82 12 46 78 2 30 56 80 102 16 34 50 64 76 86 94 100 104 0}.

Figure 6A:
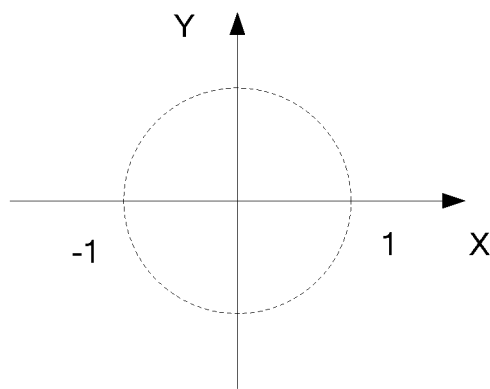
FIG. 6a is a schematic diagram of a complex number unit circle.

A digit in the above-mentioned sequence sets, for example 104, 100 in a(52) is equal to a digit after performing modulo on rn(n+1) in a generation formula $$\hat{a}_n^{(r)} = e^{\frac{i\pi}{53}r(n+1)n} = e^{\frac{i2\pi}{106}r(n+1)n} \quad (2)$$

to 106, and represents a certain point on a unit circle as shown in FIG. 6a. Formulas (3) and (4) of an autocorrelation function and a crosscorrelation function of each long training sequence in a basic sequence set are as follows:

$$R_r(\tau) = \sum_{n=0}^{N-1} \hat{a}_n^{(r)} \hat{a}_{n+\tau}^{*(r)} = \begin{cases} N, & \tau = 0(\text{mod}N) \\ 0, & \tau \neq 0(\text{mod}N) \end{cases}, gcd(r,N)=1 \quad (3)$$

$R_{r,s}(\tau)=\Sigma_{n=0}^{N-1}\hat{a}_n^{(r)}\hat{a}_{N+\tau}^{*(s)}=\sqrt{N}$, $\forall \tau$, $r \neq s$, $N$ is an odd number, and $gcd(r,N)=1$, $gcd(s,N)=1$, $gcd(r-s,N)=1$ (4)

Figure 6B:
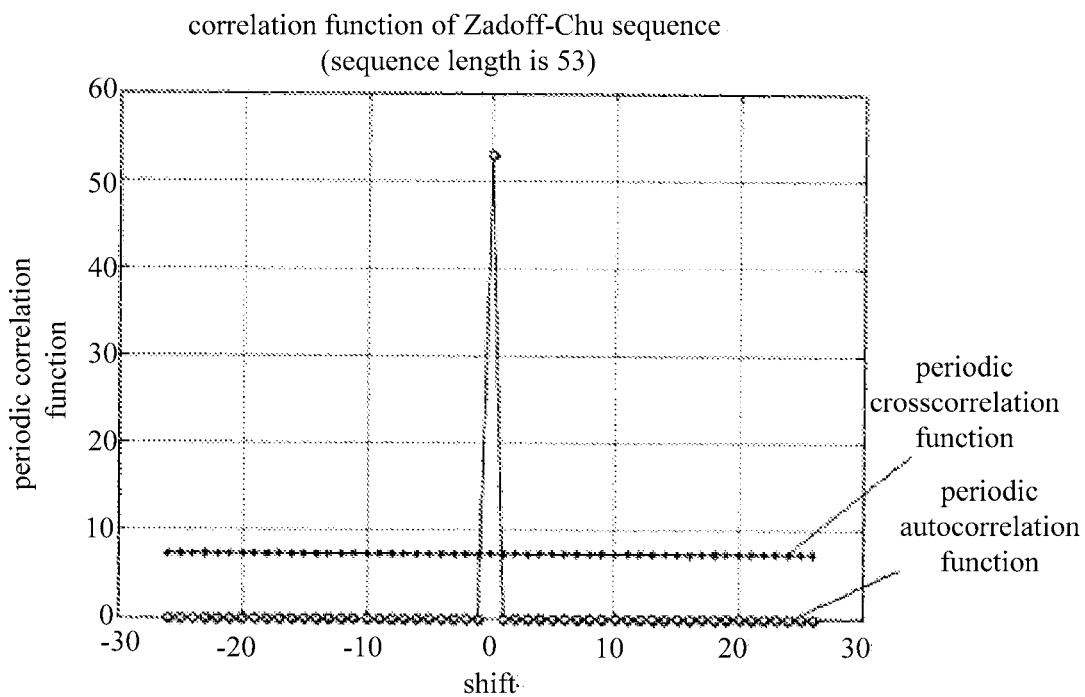
FIG. 6b is a curve chart of a correlation function of a Zadoff-Chu sequence.

N refers to the sequence length. Curves of a periodic autocorrelation function and a periodic crosscorrelation function are as shown in FIG. 6b.

Finally, cyclic shift is performed on each basic training sequence in the plurality of basic training sequences to generate a plurality of shift training sequences, and the plurality of shift training sequences are shown as follows:

a(1, 0)={0 2 6 12 20 30 42 56 72 90 4 26 50 76 104 28 60 94 24 62 102 38 82 22 70 14 66 14 70 22 82 38 102 62 24 94 60 28 104 76 50 26 4 90 72 56 42 30 20 12 6 2 0} a(1, 1)={2 6 12 20 30 42 56 72 90 4 26 50 76 104 28 60 94 24 62 102 38 82 22 70 14 66 14 70 22 82 38 102 62 24 94 60 28 104 76 50 26 4 90 72 56 42 30 20 12 6 2 0 0} a(1, 2)={6 12 20 30 42 56 72 90 4 26 50 76 104 28 60 94 24 62 102 38 82 22 70 14 66 14 70 22 82 38 102 62 24 94 60 28 104 76 50 26 4 90 72 56 42 30 20 12 6 2 0 0 2} a(1, 3)={12 20 30 42 56 72 90 4 26 50 76 104 28 60 94 24 62 102 38 82 22 70 14 66 14 70 22 82 38 102 62 24 94 60 28 104 76 50 26 4 90 72 56 42 30 20 12 6 2 0 0 2 6} a(1, 4)={20 30 42 56 72 90 4 26 50 76 104 28 60 94 24 62 102 38 82 22 70 14 66 14 70 22 82 38 102 62 24 94 60 28 104 76 50 26 4 90 72 56 42 30 20 12 6 2 0 0 2 6 12} a(1, 5)={30 42 56 72 90 4 26 50 76 104 28 60 94 24 62 102 38 82 22 70 14 66 14 70 22 82 38 102 62 24 94 60 28 104 76 50 26 4 90 72 56 42 30 20 12 6 2 0 0 2 6 12 20} a(1, 6)={42 56 72 90 4 26 50 76 104 28 60 94 24 62 102 38 82 22 70 14 66 14 70 22 82 38 102 62 24 94 60 28 104 76 50 26 4 90 72 56 42 30 20 12 6 2 0 0 2 6 12 20 30} a(1, 7)={56 72 90 4 26 50 76 104 28 60 94 24 62 102 38 82 22 70 14 66 14 70 22 82 38 102 62 24 94 60 28 104 76 50 26 4 90 72 56 42 30 20 12 6 2 0 0 2 6 12 20 30 42} a(1, 8)={72 90 4 26 50 76 104 28 60 94 24 62 102 38 82 22 70 14 66 14 70 22 82 38 102 62 24 94 60 28 104 76 50 26 4 90 72 56 42 30 20 12 6 2 0 0 2 6 12 20 30 42 56} a(1, 9)={90 4 26 50 76 104 28 60 94 24 62 102 38 82 22 70 14 66 14 70 22 82 38 102 62 24 94 60 28 104 76 50 26 4 90 72 56 42 30 20 12 6 2 0 0 2 6 12 20 30 42 56 72} a(1, 10)={4 26 50 76 104 28 60 94 24 62 102 38 82 22 70 14 66 14 70 22 82 38 102 62 24 94 60 28 104 76 50 26 4 90 72 56 42 30 20 12 6 2 0 0 2 6 12 20 30 42 56 72 90} a(1, 11)={26 50 76 104 28 60 94 24 62 102 38 82 22 70 14 66 14 70 22 82 38 102 62 24 94 60 28 104 76 50 26 4 90 72 56 42 30 20 12 6 2 0 0 2 6 12 20 30 42 56 72 90 4} a(1, 12)={50 76 104 28 60 94 24 62 102 38 82 22 70 14 66 14 70 22 82 38 102 62 24 94 60 28 104 76 50 26 4 90 72 56 42 30 20 12 6 2 0 0 2 6 12 20 30 42 56 72 90 4 26} a(1, 13)={76 104 28 60 94 24 62 102 38 82 22 70 14 66 14 70 22 82 38 102 62 24 94 60 28 104 76 50 26 4 90 72 56 42 30 20 12 6 2 0 0 2 6 12 20 30 42 56 72 90 4 26 50} a(1, 14)={104 28 60 94 24 62 102 38 82 22 70 14 66 14 70 22 82 38 102 62 24 94 60 28 104 76 50 26 4 90 72 56 42 30 20 12 6 2 0 0 2 6 12 20 30 42 56 72 90 4 26 50 76} a(1, 15)={28 60 94 24 62 102 38 82 22 70 14 66 14 70 22 82 38 102 62 24 94 60 28 104 76 50 26 4 90 72 56 42 30 20 12 6 2 0 0 2 6 12 20 30 42 56 72 90 4 26 50 76 104} a(1, 16)={60 94 24 62 102 38 82 22 70 14 66 14 70 22 82 38 102 62 24 94 60 28 104 76 50 26 4 90 72 56 42 30 20 12 6 2 0 0 2 6 12 20 30 42 56 72 90 4 26 50 76 104 28} a(1, 17)={94 24 62 102 38 82 22 70 14 66 14 70 22 82 38 102 62 24 94 60 28 104 76 50 26 4 90 72 56 42 30 20 12 6 2 0 0 2 6 12 20 30 42 56 72 90 4 26 50 76 104 28 60} a(1, 18)={24 62 102 38 82 22 70 14 66 14 70 22 82 38 102 62 24 94 60 28 104 76 50 26 4 90 72 56 42 30 20 12 6 2 0 0 2 6 12 20 30 42 56 72 90 4 26 50 76 104 28 60 94} a(1, 19)={62 102 38 82 22 70 14 66 14 70 22 82 38 102 62 24 94 60 28 104 76 50 26 4 90 72 56 42 30 20 12 6 2 0 0 2 6 12 20 30 42 56 72 90 4 26 50 76 104 28 60 94 24} a(1, 20)={102 38 82 22 70 14 66 14 70 22 82 38 102 62 24 94 60 28 104 76 50 26 4 90 72 56 42 30 20 12 6 2 0 0 2 6 12 20 30 42 56 72 90 4 26 50 76 104 28 60 94 24 62} a(1, 21)={38 82 22 70 14 66 14 70 22 82 38 102 62 24 94 60 28 104 76 50 26 4 90 72 56 42 30 20 12 6 2 0 0 2 6 12 20 30 42 56 72 90 4 26 50 76 104 28 60 94 24 62 102} a(1, 22)={82 22 70 14 66 14 70 22 82 38 102 62 24 94 60 28 104 76 50 26 4 90 72 56 42 30 20 12 6 2 0 0 2 6 12 20 30 42 56 72 90 4 26 50 76 104 28 60 94 24 62 102 38} a(1, 23)={22 70 14 66 14 70 22 82 38 102 62 24 94 60 28 104 76 50 26 4 90 72 56 42 30 20 12 6 2 0 0 2 6 12 20 30 42 56 72 90 4 26 50 76 104 28 60 94 24 62 102 38 82} a(1, 24)={70 14 66 14 70 22 82 38 102 62 24 94 60 28 104 76 50 26 4 90 72 56 42 30 20 12 6 2 0 0 2 6 12 20 30 42 56 72 90 4 26 50 76 104 28 60 94 24 62 102 38 82 22} a(1, 25)={14 66 14 70 22 82 38 102 62 24 94 60 28 104 76 50 26 4 90 72 56 42 30 20 12 6 2 0 0 2 6 12 20 30 42 56 72 90 4 26 50 76 104 28 60 94 24 62 102 38 82 22 70} a(1, 26)={66 14 70 22 82 38 102 62 24 94 60 28 104 76 50 26 4 90 72 56 42 30 20 12 6 2 0 0 2 6 12 20 30 42 56 72 90 4 26 50 76 104 28 60 94 24 62 102 38 82 22 70 14} a(1, 27)={14 70 22 82 38 102 62 24 94 60 28 104 76 50 26 4 90 72 56 42 30 20 12 6 2 0 0 2 6 12 20 30 42 56 72 90 4 26 50 76 104 28 60 94 24 62 102 38 82 22 70 14 66} a(1, 28)={70 22 82 38 102 62 24 94 60 28 104 76 50 26 4 90 72 56 42 30 20 12 6 2 0 0 2 6 12 20 30 42 56 72 90 4 26 50 76 104 28 60 94 24 62 102 38 82 22 70 14 66 14} a(1, 29)={22 82 38 102 62 24 94 60 28 104 76 50 26 4 90 72 56 42 30 20 12 6 2 0 0 2 6 12 20 30 42 56 72 90 4 26 50 76 104 28 60 94 24 62 102 38 82 22 70 14 66 14 70} a(1, 30)={82 38 102 62 24 94 60 28 104 76 50 26 4 90 72 56 42 30 20 12 6 2 0 0 2 6 12 20 30 42 56 72 90 4 26 50 76 104 28 60 94 24 62 102 38 82 22 70 14 66 14 70 22} a(1, 31)={38 102 62 24 94 60 28 104 76 50 26 4 90 72 56 42 30 20 12 6 2 0 0 2 6 12 20 30 42 56 72 90 4 26 50 76 104 28 60 94 24 62 102 38 82 22 70 14 66 14 70 22 82} a(1, 32)={102 62 24 94 60 28 104 76 50 26 4 90 72 56 42 30 20 12 6 2 0 0 2 6 12 20 30 42 56 72 90 4 26 50 76 104 28 60 94 24 62 102 38 82 22 70 14 66 14 70 22 82 38} a(1, 33)={62 24 94 60 28 104 76 50 26 4 90 72 56 42 30 20 12 6 2 0 0 2 6 12 20 30 42 56 72 90 4 26 50 76 104 28 60 94 24 62 102 38 82 22 70 14 66 14 70 22 82 38 102} a(1, 34)={24 94 60 28 104 76 50 26 4 90 72 56 42 30 20 12 6 2 0 0 2 6 12 20 30 42 56 72 90 4 26 50 76 104 28 60 94 24 62 102 38 82 22 70 14 66 14 70 22 82 38 102 62} a(1, 35)={94 60 28 104 76 50 26 4 90 72 56 42 30 20 12 6 2 0 0 2 6 12 20 30 42 56 72 90 4 26 50 76 104 28 60 94 24 62 102 38 82 22 70 14 66 14 70 22 82 38 102 62 24} a(1, 36)={60 28 104 76 50 26 4 90 72 56 42 30 20 12 6 2 0 0 2 6 12 20 30 42 56 72 90 4 26 50 76 104 28 60 94 24 62 102 38 82 22 70 14 66 14 70 22 82 38 102 62 24 94} a(1, 37)={28 104 76 50 26 4 90 72 56 42 30 20 12 6 2 0 0 2 6 12 20 30 42 56 72 90 4 26 50 76 104 28 60 94 24 62 102 38 82 22 70 14 66 14 70 22 82 38 102 62 24 94 60} a(1, 38)={104 76 50 26 4 90 72 56 42 30 20 12 6 2 0 0 2 6 12 20 30 42 56 72 90 4 26 50 76 104 28 60 94 24 62 102 38 82 22 70 14 66 14 70 22 82 38 102 62 24 94 60 28} a(1, 39)={76 50 26 4 90 72 56 42 30 20 12 6 2 0 0 2 6 12 20 30 42 56 72 90 4 26 50 76 104 28 60 94 24 62 102 38 82 22 70 14 66 14 70 22 82 38 102 62 24 94 60 28 104} a(1, 40)={50 26 4 90 72 56 42 30 20 12 6 2 0 0 2 6 12 20 30 42 56 72 90 4 26 50 76 104 28 60 94 24 62 102 38 82 22 70 14 66 14 70 22 82 38 102 62 24 94 60 28 104 76} a(1, 41)={26 4 90 72 56 42 30 20 12 6 2 0 0 2 6 12 20 30 42 56 72 90 4 26 50 76 104 28 60 94 24 62 102 38 82 22 70 14 66 14 70 22 82 38 102 62 24 94 60 28 104 76 50} a(1, 42)={4 90 72 56 42 30 20 12 6 2 0 0 2 6 12 20 30 42 56 72 90 4 26 50 76 104 28 60 94 24 62 102 38 82 22 70 14 66 14 70 22 82 38 102 62 24 94 60 28 104 76 50 26} a(1, 43)={90 72 56 42 30 20 12 6 2 0 0 2 6 12 20 30 42 56 72 90 4 26 50 76 104 28 60 94 24 62 102 38 82 22 70 14 66 14 70 22 82 38 102 62 24 94 60 28 104 76 50 26 4} a(1, 44)={72 56 42 30 20 12 6 2 0 0 2 6 12 20 30 42 56 72 90 4 26 50 76 104 28 60 94 24 62 102 38 82 22 70 14 66 14 70 22 82 38 102 62 24 94 60 28 104 76 50 26 4 90} a(1, 45)={56 42 30 20 12 6 2 0 0 2 6 12 20 30 42 56 72 90 4 26 50 76 104 28 60 94 24 62 102 38 82 22 70 14 66 14 70 22 82 38 102 62 24 94 60 28 104 76 50 26 4 90 72} a(1, 46)={42 30 20 12 6 2 0 0 2 6 12 20 30 42 56 72 90 4 26 50 76 104 28 60 94 24 62 102 38 82 22 70 14 66 14 70 22 82 38 102 62 24 94 60 28 104 76 50 26 4 90 72 56} a(1, 47)={30 20 12 6 2 0 0 2 6 12 20 30 42 56 72 90 4 26 50 76 104 28 60 94 24 62 102 38 82 22 70 14 66 14 70 22 82 38 102 62 24 94 60 28 104 76 50 26 4 90 72 56 42} a(1, 48)={20 12 6 2 0 0 2 6 12 20 30 42 56 72 90 4 26 50 76 104 28 60 94 24 62 102 38 82 22 70 14 66 14 70 22 82 38 102 62 24 94 60 28 104 76 50 26 4 90 72 56 42 30} a(1, 49)={12 6 2 0 0 2 6 12 20 30 42 56 72 90 4 26 50 76 104 28 60 94 24 62 102 38 82 22 70 14 66 14 70 22 82 38 102 62 24 94 60 28 104 76 50 26 4 90 72 56 42 30 20} a(1, 50)={6 2 0 0 2 6 12 20 30 42 56 72 90 4 26 50 76 104 28 60 94 24 62 102 38 82 22 70 14 66 14 70 22 82 38 102 62 24 94 60 28 104 76 50 26 4 90 72 56 42 30 20 12} a(1, 51)={2 0 0 2 6 12 20 30 42 56 72 90 4 26 50 76 104 28 60 94 24 62 102 38 82 22 70 14 66 14 70 22 82 38 102 62 24 94 60 28 104 76 50 26 4 90 72 56 42 30 20 12 6} a(1, 52)={0 0 2 6 12 20 30 42 56 72 90 4 26 50 76 104 28 60 94 24 62 102 38 82 22 70 14 66 14 70 22 82 38 102 62 24 94 60 28 104 76 50 26 4 90 72 56 42 30 20 12 6 2} a(2, 0), a(2, 1), . . . , a(2, 52)

a(3, 0), a(3, 1), . . . , a(3, 52)

. . .

a(52, 0), a(52, 1), . . . , a(52, 52)

A complete sequence set formed by the above-mentioned basic training sequences and the shift training sequences includes 52×53=2756 sequences in total, and in a same area, 2756 transmitting ends may be distinguished at most. In a basic architectural mode, in a same area, 52 APs may be distinguished, and 53 STAs may be distinguished under each AP.

Figure 7:
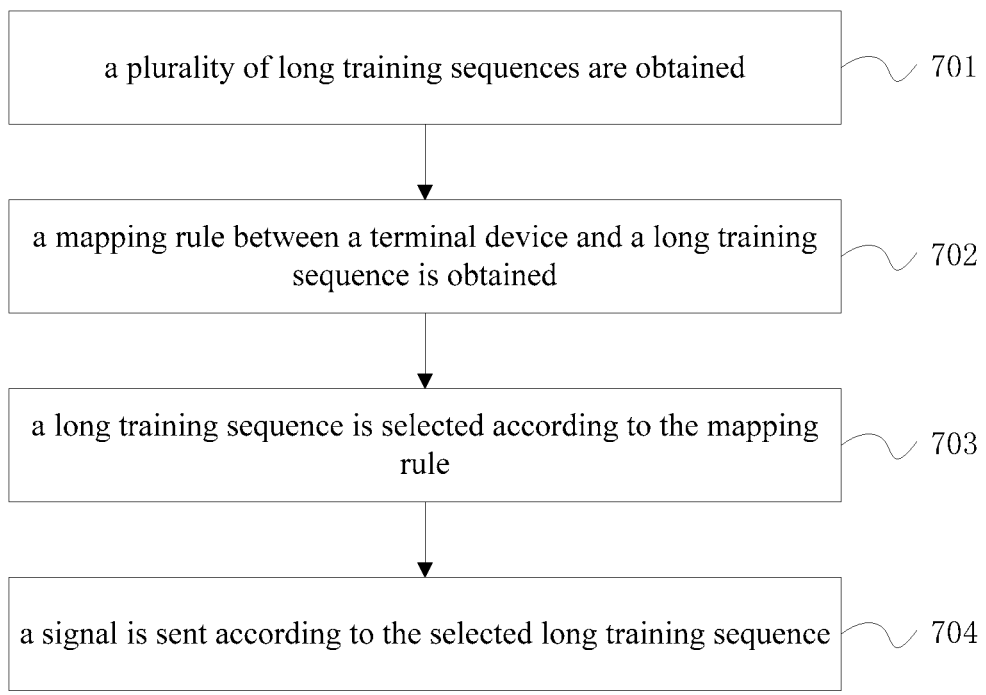
FIG. 7 is a flowchart of a method for sending a signal provided by an embodiment of the present disclosure.

FIG. 7 is a flowchart of a method for sending a signal provided by an embodiment of the present disclosure. An executive body of the embodiment is a sending device, which may be an AP or an STA, and referring to FIG. 7, the method includes:

701. a plurality of long training sequences are obtained, where the plurality of long training sequences include a plurality of basic training sequences and a plurality of shift training sequences obtained according to cyclic shift of the basic training sequences.

Optionally, obtaining the plurality of long training sequences includes: obtaining the plurality of long training sequences according to a system parameter and a preset sequence construction formula, where the plurality of long training sequences include a plurality of basic training sequences and a plurality of shift training sequences obtained according to cyclic shift of the basic training sequences.

Optionally, obtaining the plurality of long training sequences includes: receiving a plurality of long training sequences sent by a configuration device.

702. A mapping rule between a terminal device and a long training sequence is obtained.

The mapping rule in step 702 is same as the mapping rule in the above-mentioned embodiment, and will not be repeated redundantly herein.

703. A long training sequence is selected according to the mapping rule.

It should be noted that, the embodiment of the present disclosure is only illustrated by obtaining the mapping relationship between the long training sequence and the terminal device, actually, in a practical application scenario, after the mapping relationship between the long training sequence and the terminal device is configured, the long training sequence used for sending a signal may be selected according to the mapping relationship between the long training sequence and the terminal device, and it will not be repeated redundantly in the embodiment of the present disclosure.

704. A signal is sent according to the selected long training sequence.

Optionally, sending the signal according to the selected long training sequence includes: generating a long training symbol of the selected long training sequence on a frequency domain according to the selected long training sequence, a sequence length of the long training sequence and a number of system subcarriers; and sending the signal according to the long training symbol of the selected long training sequence on the frequency domain. The sending the signal according to the training symbol of the training sequence on the frequency domain includes: performing inverse Fourier transform on the training symbol on the frequency domain to obtain a long training signal on a time domain; performing periodic extension on the long training signal on the time domain to obtain a cyclic prefix on the time domain, in order to improve a resisting interference capability of the system. The obtained cyclic prefix on the time domain is multiplied with a window function to generate a training sequence. Multiplying with the window function includes: multiplying with a time function according to a certain rule, to ensure better connection of signals at former and latter moments, for example, multiplying both a first symbol and a last symbol with 0.5, then the last symbol of a former signal is added with the last symbol of a latter signal, and the signal is sent according to the processed training symbol.

Optionally, the generating the long training symbol of the selected long training sequence on the frequency domain according to the selected long training sequence, the sequence length of the long training sequence and the number of the system subcarriers, includes:

when the number of the system subcarriers is greater than the sequence length of the long training sequence, setting a DC subcarrier in the system subcarriers as zero, selecting subcarriers in a number same as the sequence length of the long training sequence from non DC subcarriers in the system subcarriers, mapping elements in the long training sequence to the selected subcarriers, and interpolating a specific numerical value or a cyclic shift element of the long training sequence in a remaining non DC subcarrier in the system subcarriers to generate the long training symbol of the selected long training sequence on the frequency domain; or, when the number of the system subcarriers is equal to the sequence length of the long training sequence, mapping elements in the long training sequence to the system subcarriers, and setting a DC subcarrier in the system subcarriers as zero to generate the long training symbol of the selected long training sequence on the frequency domain; or, when the number of the system subcarriers is less than the sequence length of the long training sequence, selecting elements in the number of the system subcarriers from elements of the long training sequence, mapping the selected elements to the system subcarriers, and setting a DC subcarrier in the system subcarriers as zero to generate the long training symbol of the selected long training sequence on the frequency domain.

Optionally, the selecting the long training sequence according to the mapping rule includes:

when a local device is an AP, selecting, by the AP, an unused long training sequence from the plurality of long training sequences.

Optionally, when the local device is the AP, the selecting, by the AP, the unused long training sequence from the plurality of long training sequences, includes:

selecting an unused basic training sequence from the plurality of basic training sequences;

or, selecting at least two unused basic training sequences from the plurality of basic training sequences and selecting a basic training sequence having worst relativity with a basic training sequence in use from the at least two unused basic training sequences;

or, when a number of STAs associated with the AP is greater than a number of shift training sequences corresponding to a basic training sequence, selecting, by the AP, at least one unused basic training sequence.

Optionally, different basic training sequences are selected for adjacent APs. Specifically, different basic training sequences are selected for adjacent APs of a same operator; and/or, different basic training sequences are selected for adjacent APs of different operators.

Optionally, the selecting the long training sequence according to the mapping rule includes:

when a local device is an STA, selecting a shift training sequence from shift training sequences generated from a basic training sequence corresponding to an AP associated with the STA.

Optionally, when the local device is the STA, the selecting the shift training sequence from the shift training sequences generated from the basic training sequence corresponding to the AP associated with the STA includes:

when the local device has a plurality of associated APs, selecting a shift training sequence from shift training sequences generated from a basic training sequence corresponding to a primary AP associated with the local device.

Optionally, when the local device is the STA, the selecting the shift training sequence from the shift training sequences generated from the basic training sequence corresponding to the AP associated with the STA includes:

selecting a shift training sequence having a maximum shift with a used shift training sequence from the shift training sequences generated from the basic training sequence corresponding to the AP associated with the local device.

Optionally, when a local device is an STA, the method further includes: receiving a long training sequence configured by an AP associated with the local device.

Optionally, selecting the long training sequence according to the mapping rule includes:

generating a long training sequence identity according to identity information of the local device, and selecting a long training sequence corresponding to the long training sequence identity from the plurality of long training sequences.

Figure 8:
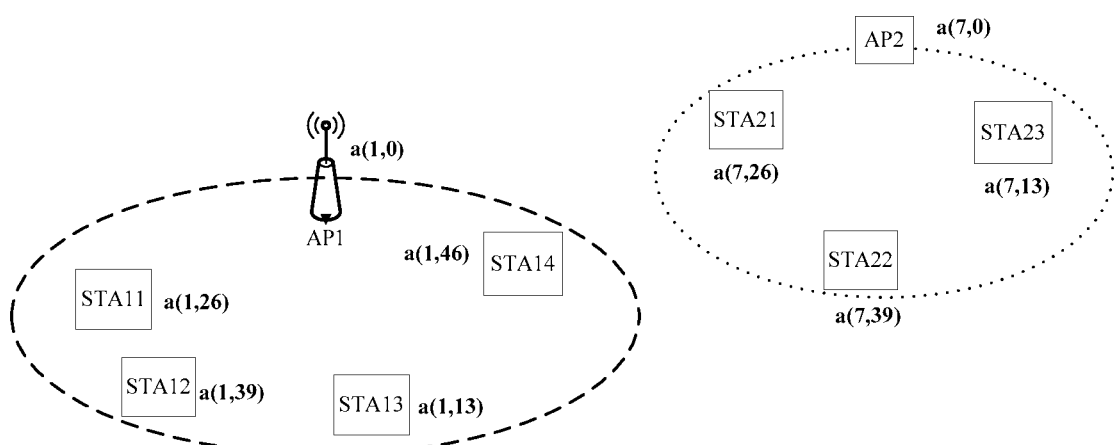
FIG. 8 is a network architecture diagram of an example provided by an embodiment of the present disclosure.

For convenience of illustration, an illustration will be given below by taking it as an example that an AP and an STA associated with the AP send signals. FIG. 8 is a network architecture diagram of an example provided by an embodiment of the present disclosure. Referring to FIG. 8, the network architecture includes an AP1, and an STA 11, an STA 12, an STA 13 and an STA 14 associated with the AP1, an AP2, an STA21, an STA22 and an STA23 associated with the AP2. Based on FIG. 8, when selecting a training sequence, the embodiment of the present disclosure may be specifically implemented as follows.

At first, the AP1 selects a (1,0) in a plurality of basic training sequences; and the AP2 selects a (7,0) in the plurality of basic training sequences.

Then, in STAs associated with the AP1, shift training sequences a (1, 26), a (1, 39), a (1, 13) and a (1, 46) of a (1,0) are respectively selected for the STA 11, the STA 12, the STA 13 and the STA 14. Selection may be configured to the corresponding STA after being selected by the AP1, or the STA performs selecting according to the basic training sequence of the AP1 after obtaining the basic training sequence of the AP1.

In STAs associated with the AP2, shift training sequences a (7, 26), a (7, 39) and a (7, 13) of a (7,0) are respectively selected for the STA21, the STA22 and the STA23. Selection may be configured to the corresponding STA after being selected by the AP2, or the STA performs selecting according to the basic training sequence of the AP2 after obtaining the basic training sequence of the AP2.

Figure 9:
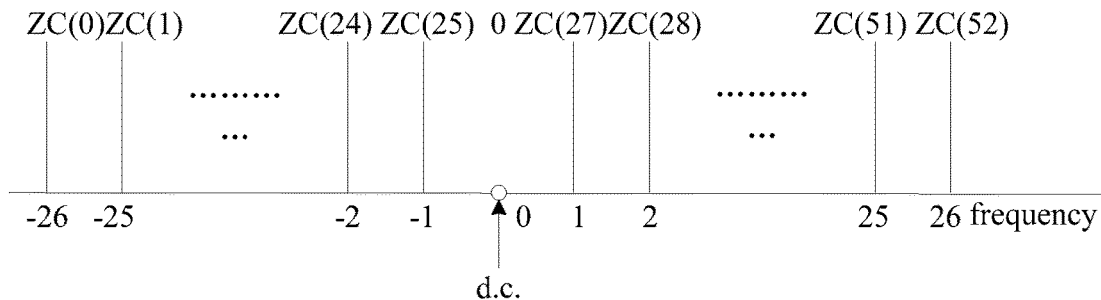
FIG. 9 is a mapping relationship between a sequence element and a subcarrier.
Figure 10:
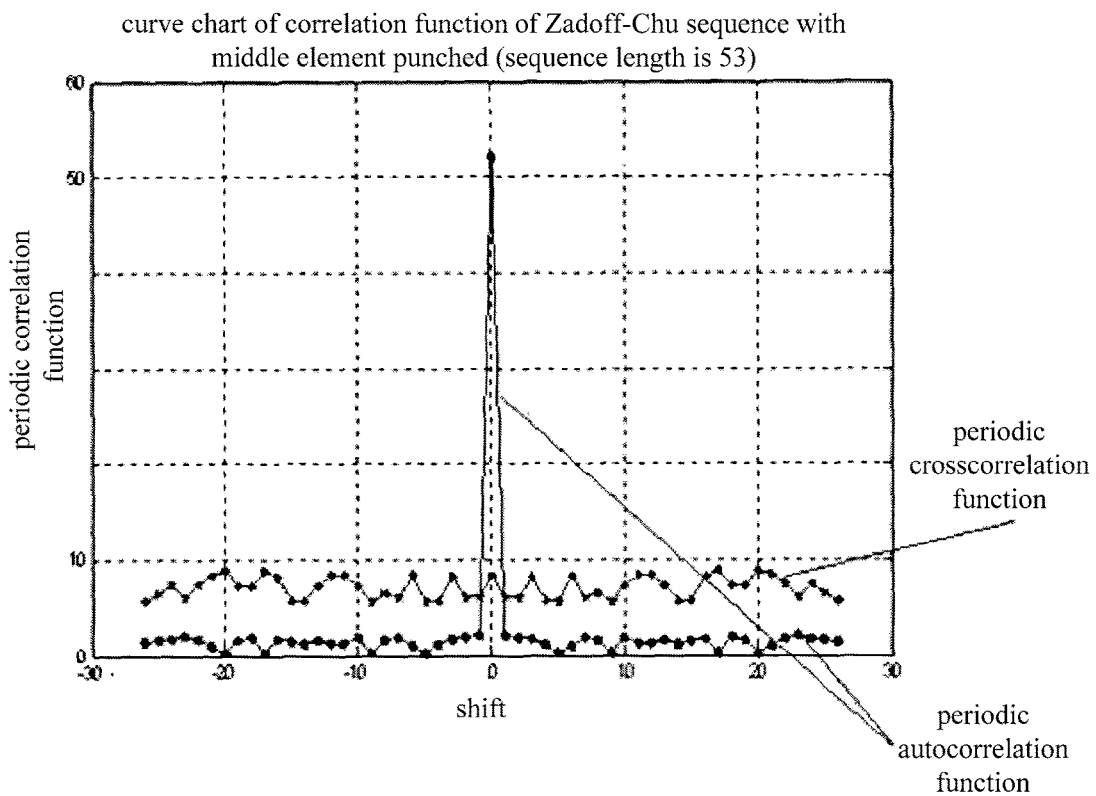
FIG. 10 is a curve chart of a correlation function of a Zadoff-Chu sequence with a middle element punched.
Figure 11:
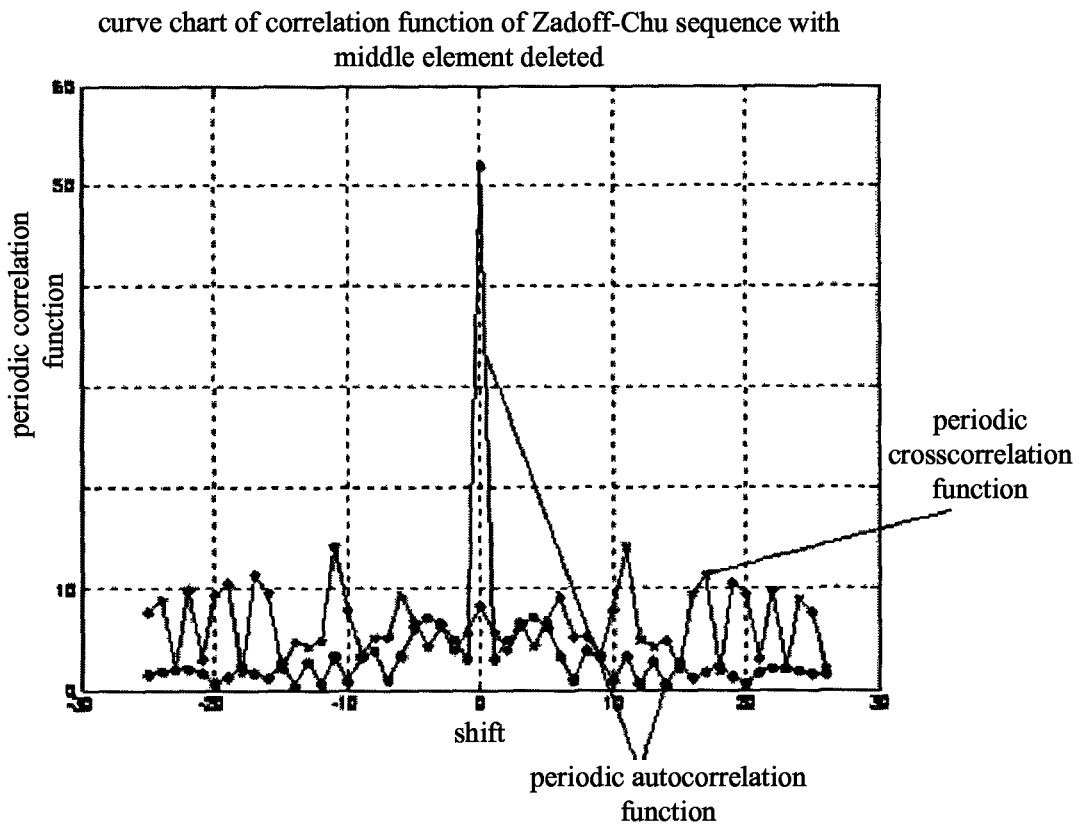
FIG. 11 is a curve chart of a correlation function of a Zadoff-Chu sequence with a middle element deleted.

Each AP and STA generate long training symbols on the frequency domain. In the example, an illustration is only given by taking it as an example that the number of subcarriers is equal to the sequence length of the training sequence. As shown in FIG. 9, elements in the training sequence are mapped to the subcarriers one by one, and then a DC subcarrier component is set as 0. When calculating a correlation function on the frequency domain, if the DC subcarrier component is included, and the sequence length is still 53, then a curve of the correlation function is as shown in FIG. 10; if the DC subcarrier component is not included, and the sequence length is 52, then a curve of the correlation function is as shown in FIG. 11.

Figure 12:
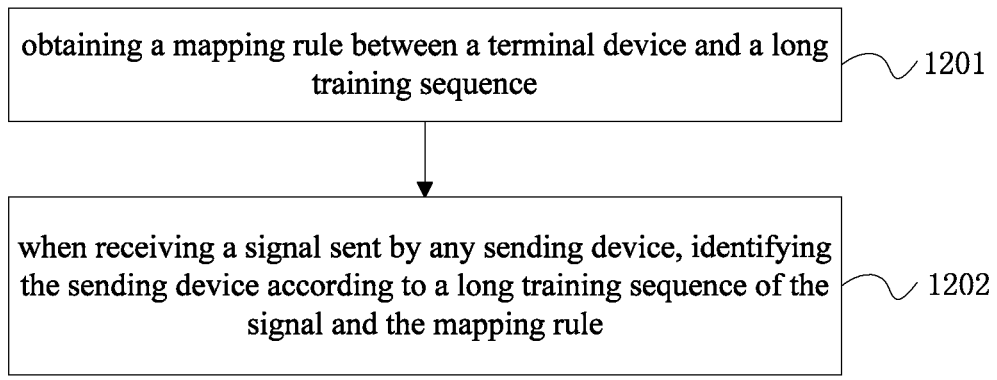
FIG. 12 is a flowchart of a method for identifying a device provided by an embodiment of the present disclosure.

FIG. 12 is a flowchart of a method for identifying a device provided by an embodiment of the present disclosure, referring to FIG. 12, including:

1201. obtaining a mapping rule between a terminal device and a long training sequence;

1202. when receiving a signal sent by any sending device, identifying the sending device according to a long training sequence of the signal and the mapping rule.

Optionally, step 1202 "when receiving a signal sent by any sending device, identifying the sending device according to a long training sequence of the signal and the mapping rule" includes:

analyzing the long training sequence of the signal on a physical layer, and determining a terminal device corresponding to the long training sequence according to the long training sequence and the mapping rule.

By adopting the method provided by the embodiment of the present disclosure, a receiving end may identify a transmitting end by analyzing a training sequence of a signal, meanwhile, this solution may further improve accuracy of channel estimation of the receiving end and may also be applied to a next generation Wi-Fi network to improve system performance.

The present disclosure may be applied to a wireless local area network, including, but not limited to a Wi-Fi system represented by IEEE 802.11a, 802.11b, 802.11g, 802.11n, or 802.11ac, and may also be applied to a next generation Wi-Fi system.

Figure 13:
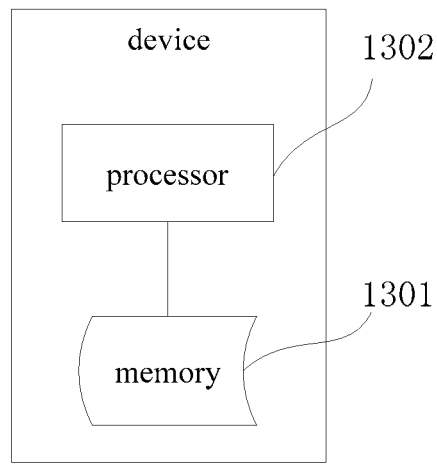
FIG. 13 is a schematic diagram of a structure of a device provided by an embodiment of the present disclosure.

FIG. 13 is a schematic diagram of a structure of a device provided by an embodiment of the present disclosure. Referring to FIG. 13, the device includes a memory 1301 and a processor 1302, the memory 1301 is connected with the processor 1302, the memory 1301 stores a program code, and the processor 1302 is configured to invoke the program code to execute the following operations:

obtaining a plurality of long training sequences according to a system parameter and a preset sequence construction formula, where the plurality of long training sequences include a plurality of basic training sequences and a plurality of shift training sequences obtained according to cyclic shift of the basic training sequences; and configuring a mapping rule between a terminal device and a long training sequence, for enabling the terminal device to select a long training sequence according to the mapping rule as a long training sequence for sending a signal.

Optionally, the processor 1302 is further configured to invoke the program code to execute the following operations: obtaining a number of available subcarriers according to the system parameter; determining the preset sequence construction formula; determining a sequence length according to the number of the available subcarriers and the determined preset sequence construction formula; obtaining the plurality of basic training sequences conforming to the sequence length according to the preset sequence construction formula and the determined sequence length; and performing cyclic shift on each basic training sequence in the plurality of basic training sequences to generate the plurality of shift training sequences.

Optionally, the processor 1302 is further configured to invoke the program code to execute the following operation: generating long training symbols of the plurality of long training sequences on a frequency domain according to the plurality of long training sequences, a length of the long training sequence and a number of system subcarriers.

Optionally, the processor 1302 is further configured to invoke the program code to execute the following operations: configuring a mapping rule between an access point (AP) and the long training sequence; and configuring a mapping rule between a station (STA) and the long training sequence.

Optionally, the processor 1302 is further configured to invoke the program code to execute the following operations: configuring a mapping rule between an access point (AP) in a wireless local area network environment and the long training sequence; and/or, configuring a mapping rule between a station (STA) in a wireless local area network environment and the long training sequence.

Optionally, the processor 1302 is further configured to invoke the program code to execute the following operation: configuring the mapping rule between the access point (AP) and the long training sequence as that the AP selects an unused long training sequence from the plurality of long training sequences.

Optionally, the processor 1302 is further configured to invoke the program code to execute the following operation: configuring the mapping rule between the access point (AP) and the long training sequence as that the AP selects an unused basic training sequence from the plurality of basic training sequences;

or, configuring the mapping rule between the access point (AP) and the long training sequence as that the AP selects at least two unused basic training sequences from the plurality of basic training sequences and selects a basic training sequence having worst relativity with a basic training sequence in use from the at least two unused basic training sequences;

or, configuring the mapping rule between the access point (AP) and the long training sequence as that when a number of STAs associated with the AP is greater than a number of shift training sequences corresponding to a basic training sequence, the AP selects at least one unused basic training sequence.

Optionally, configuring the mapping rule between the access point (AP) and the long training sequence as that adjacent APs select different basic training sequences Optionally, the processor 1302 is further configured to invoke the program code to execute the following operation: configuring the mapping rule between the station (STA) and the long training sequence as that the STA selects a shift training sequence from shift training sequences generated from a basic training sequence corresponding to an AP associated with the STA as a long training sequence corresponding to the STA.

Optionally, the processor 1302 is further configured to invoke the program code to execute the following operation: configuring the mapping rule between the station (STA) and the long training sequence as that when the STA has a plurality of associated APs, the STA selects a shift training sequence from shift training sequences generated from a basic training sequence corresponding to a primary AP associated with the STA as the long training sequence corresponding to the STA.

Optionally, the processor 1302 is further configured to invoke the program code to execute the following operation: configuring the mapping rule between the station (STA) and the long training sequence as that the STA selects a shift training sequence having a maximum shift with a used shift training sequence from the shift training sequences generated from the basic training sequence corresponding to the AP associated with the STA as the long training sequence corresponding to the STA.

Optionally, an AP configures a long training sequence of an STA associated with the AP; or an STA selects a long training sequence.

Optionally, configuring the mapping rule between the terminal device and the long training sequence as that the terminal device selects a long training sequence from the plurality of long training sequences according to identity information of the terminal device as a long training sequence of the terminal device.

Optionally, the identity information of the terminal device includes any one of a media access control (MAC) address, an internet protocol (IP) address, a basic service set identifier (BSSID), associated identity information (AID), a mobile user cellphone number, an international mobile subscriber identity (IMSI) and an international mobile equipment identifier (IMEI).

Optionally, the processor 1302 is further configured to invoke the program code to execute the following operation: configuring the mapping rule between the terminal device and the long training sequence as that the terminal device generates a long training sequence identity according to the identity information of the terminal device, and selects a long training sequence corresponding to the long training sequence identity from the plurality of long training sequences as the long training sequence of the terminal device.

Figure 14:
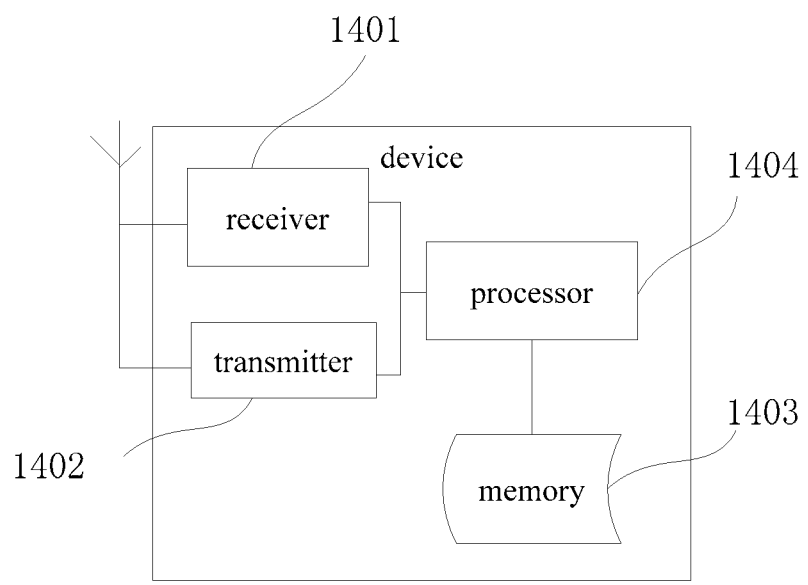
FIG. 14 is a schematic diagram of a structure of a device provided by an embodiment of the present disclosure.

FIG. 14 is a schematic diagram of a structure of a device provided by an embodiment of the present disclosure. Referring to FIG. 14, the device includes a receiver 1401, a transmitter 1402, a memory 1403 and a processor 1404, the receiver 1401, the transmitter 1402 and the memory 1403 are respectively connected with the processor 1404, the memory 1403 stores a program code, and the processor 1404 is configured to invoke the program code to execute the following operations: obtaining a plurality of long training sequences through the receiver 1401, where the plurality of long training sequences include a plurality of basic training sequences and a plurality of shift training sequences obtained according to cyclic shift of the basic training sequences; obtaining a mapping rule between a terminal device and a long training sequence through the receiver 1401; selecting a long training sequence according to the mapping rule; and sending a signal according to the selected long training sequence through the transmitter 1402.

Optionally, the processor 1404 is further configured to invoke the program code to execute the following operations: generating a long training symbol of the selected long training sequence on a frequency domain according to the selected long training sequence, a sequence length of the long training sequence and a number of system subcarriers; and sending the signal according to the long training symbol of the selected long training sequence on the frequency domain.

Optionally, the processor 1404 is further configured to invoke the program code to execute the following operations: when the number of the system subcarriers is greater than the sequence length of the long training sequence, setting a DC subcarrier in the system subcarriers as zero, selecting subcarriers in a number same as the sequence length of the long training sequence from non DC subcarriers in the system subcarriers, mapping elements in the long training sequence to the selected subcarriers, and interpolating a specific numerical value or a cyclic shift element of the long training sequence in a remaining non DC subcarrier in the system subcarriers to generate the long training symbol of the selected long training sequence on the frequency domain; or, when the number of the system subcarriers is equal to the sequence length of the long training sequence, mapping elements in the long training sequence to the system subcarriers, and setting a DC subcarrier in the system subcarriers as zero to generate the long training symbol of the selected long training sequence on the frequency domain; or, when the number of the system subcarriers is less than the sequence length of the long training sequence, selecting elements in the number of the system subcarriers from elements of the long training sequence, mapping the selected elements to the system subcarriers, and setting a DC subcarrier in the system subcarriers as zero to generate the long training symbol of the selected long training sequence on the frequency domain.

Optionally, the processor 1404 is further configured to invoke the program code to execute the following operation: when a local device is an AP, selecting, by the AP, an unused long training sequence from the plurality of long training sequences.

Optionally, the processor 1404 is further configured to invoke the program code to execute the following operation: selecting an unused basic training sequence from the plurality of basic training sequences;

or, selecting at least two unused basic training sequences from the plurality of basic training sequences and selecting a basic training sequence having worst relativity with a basic training sequence in use from the at least two unused basic training sequences;

or, when a number of STAs associated with the AP is greater than a number of shift training sequences corresponding to a basic training sequence, selecting, by the AP, at least one unused basic training sequence.

Optionally, different basic training sequences are selected for adjacent APs.

Optionally, the processor 1404 is further configured to invoke the program code to execute the following operation: when a local device is an STA, selecting a shift training sequence from shift training sequences generated from a basic training sequence corresponding to an AP associated with the STA.

Optionally, the processor 1404 is further configured to invoke the program code to execute the following operation: when the local device has a plurality of associated APs, selecting a shift training sequence from shift training sequences generated from a basic training sequence corresponding to a primary AP associated with the local device.

Optionally, the processor 1404 is further configured to invoke the program code to execute the following operation: selecting a shift training sequence having a maximum shift with a used shift training sequence from the shift training sequences generated from the basic training sequence corresponding to the AP associated with the local device.

Optionally, the processor 1404 is further configured to invoke the program code to execute the following operation: receiving a long training sequence configured by an AP associated with the local device through the receiver 1401.

Optionally, the processor 1404 is further configured to invoke the program code to execute the following operations: generating a long training sequence identity according to identity information of the local device, and selecting a long training sequence corresponding to the long training sequence identity from the plurality of long training sequences.

Figure 15:
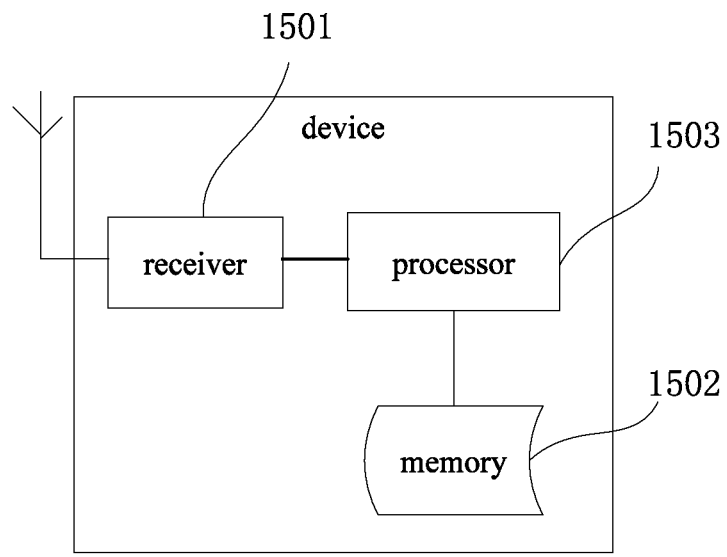
FIG. 15 is a schematic diagram of a structure of a device provided by an embodiment of the present disclosure.

FIG. 15 is a schematic diagram of a structure of a device provided by an embodiment of the present disclosure. Referring to FIG. 15, the device includes a receiver 1501, a memory 1502 and a processor 1503, the receiver 1501 and the memory 1502 are respectively connected with the processor 1503, the memory 1502 stores a program code, and the processor 1503 is configured to invoke the program code to execute the following operations: obtaining a mapping rule between a terminal device and a long training sequence; when receiving a signal sent by any sending device, identifying the sending device according to a long training sequence of the signal and the mapping rule.

Figure 16:
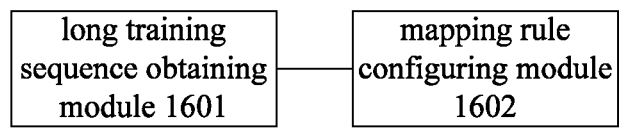
FIG. 16 is a schematic diagram of a structure of an apparatus for generating a long training sequence provided by an embodiment of the present disclosure.

FIG. 16 is a schematic diagram of a structure of an apparatus for generating a long training sequence provided by an embodiment of the present disclosure. Referring to FIG. 16, the apparatus includes:

a long training sequence obtaining module 1601, configured to obtain a plurality of long training sequences according to a system parameter and a preset sequence construction formula, where the plurality of long training sequences include a plurality of basic training sequences and a plurality of shift training sequences obtained according to cyclic shift of the basic training sequences;

a mapping rule configuring module 1602, configured to configure a mapping rule between a terminal device and a long training sequence, for enabling the terminal device to select a long training sequence according to the mapping rule as a long training sequence for sending a signal.

Optionally, the long training sequence obtaining module 1601 is configured to obtain a number of available subcarriers according to the system parameter; determine the preset sequence construction formula; determine a sequence length according to the number of the available subcarriers and the determined preset sequence construction formula; obtain the plurality of basic training sequences conforming to the sequence length according to the preset sequence construction formula and the determined sequence length; and perform cyclic shift on each basic training sequence in the plurality of basic training sequences to generate the plurality of shift training sequences.

Optionally, the apparatus further includes: a long training symbol generating module 1603, where the long training symbol generating module 1603 is configured to, when the number of the system subcarriers is greater than the sequence length of the long training sequence, set a DC subcarrier in the system subcarriers as zero, select subcarriers in a number same as the sequence length of the long training sequence from non DC subcarriers in the system subcarriers, map elements in the long training sequence to the selected subcarriers, and interpolate a specific numerical value or a cyclic shift element of the long training sequence in a remaining non DC subcarrier in the system subcarriers to generate the long training symbol on the frequency domain; or, the long training symbol generating module 1603 is configured to, when the number of the system subcarriers is equal to the sequence length of the long training sequence, map elements in the long training sequence to the system subcarriers, and set a DC subcarrier in the system subcarriers as zero to generate the long training symbol on the frequency domain; or, the long training symbol generating module 1603 is configured to, when the number of the system subcarriers is less than the sequence length of the long training sequence, select elements in the number of the system subcarriers from elements of the long training sequence, map the selected elements to the system subcarriers, and set a DC subcarrier in the system subcarriers as zero to generate the long training symbol on the frequency domain.

Optionally, in a wireless local area network environment, the mapping rule configuring module 1602 includes:

a first configuring unit, configured to configure a mapping rule between an access point (AP) in the wireless local area network environment and the long training sequence;

and/or, a second configuring unit, configured to configure a mapping rule between a station (STA) in the wireless local area network environment and the long training sequence.

Optionally, the first configuring unit is configured to configure the mapping rule between the access point (AP) and the long training sequences as selecting an unused long training sequence from the plurality of long training sequences.

Optionally, the first configuring unit is configured to configure the mapping rule between the access point (AP) and the long training sequence as that the AP selects an unused basic training sequence from the plurality of basic training sequences;

or, the first configuring unit is configured to configure the mapping rule between the access point (AP) and the long training sequence as that the AP selects at least two unused basic training sequences from the plurality of basic training sequences and selects a basic training sequence having worst relativity with a basic training sequence in use from the at least two unused basic training sequences;

or, the first configuring unit is configured to configure the mapping rule between the access point (AP) and the long training sequence as that when a number of STAs associated with the AP is greater than a number of shift training sequences corresponding to a basic training sequence, the AP selects at least one unused basic training sequence.

Optionally, the mapping rule configuring module is configured to configure the mapping rule between the access point (AP) and the long training sequence as that adjacent APs select different basic training sequences.

Optionally, the second configuring unit is configured to configure the mapping rule between the station (STA) and the long training sequence as that the STA selects a shift training sequence from shift training sequences generated from a basic training sequence corresponding to an AP associated with the STA as a long training sequence corresponding to the STA.

Optionally, the second configuring unit is configured to configure the mapping rule between the station (STA) and the long training sequence as that when the STA has a plurality of associated APs, the STA selects a shift training sequence from shift training sequences generated from a basic training sequence corresponding to a primary AP associated with the STA as the long training sequence corresponding to the STA.

Optionally, the second configuring unit is configured to configure the mapping rule between the station (STA) and the long training sequence as that the STA selects a shift training sequence having a maximum shift with a used shift training sequence from the shift training sequences generated from the basic training sequence corresponding to the AP associated with the STA as the long training sequence corresponding to the STA.

Optionally, an AP configures a long training sequence of an STA associated with the AP; or an STA selects a long training sequence.

Optionally, the mapping rule configuring module is configured to configure the mapping rule between the terminal device and the long training sequence as that the terminal device selects a long training sequence from the plurality of long training sequences according to identity information of the terminal device as a long training sequence corresponding to the terminal device.

Optionally, the identity information of the terminal device includes any one of a media access control (MAC) address, an internet protocol (IP) address, a basic service set identifier (BSSID), associated identity information (AID), a mobile user cellphone number, an international mobile subscriber identity (IMSI) and an international mobile equipment identifier (IMEI).

Optionally, the mapping rule configuring module is configured to configure the mapping rule between the terminal device and the long training sequence as that the terminal device generates a long training sequence identity according to the identity information of the terminal device, and selects a long training sequence corresponding to the long training sequence identity from the plurality of long training sequences as the long training sequence corresponding to the terminal device.

Figure 17:
FIG. 17 is a schematic diagram of a structure of an apparatus for sending a signal provided by an embodiment of the present disclosure.

FIG. 17 is a schematic diagram of a structure of an apparatus for sending a signal provided by an embodiment of the present disclosure. Referring to FIG. 17, the apparatus includes:

a long training sequence obtaining module 1701, configured to obtain a plurality of long training sequences, where the plurality of long training sequences include a plurality of basic training sequences and a plurality of shift training sequences obtained according to cyclic shift of the basic training sequences;

a mapping rule obtaining module 1702, configured to obtain a mapping rule of a terminal device and a long training sequence;

a long training sequence selecting module 1703, configured to select a long training sequence according to the mapping rule;

a sending module 1704, configured to send a signal according to the selected long training sequence.

Optionally, the sending module 1704 includes:

a long training symbol generating unit, configured to generate a long training symbol of the selected long training sequence on a frequency domain according to the selected long training sequence, a sequence length of the long training sequence and a number of system subcarriers; and a sending unit, configured to send the signal according to the long training symbol of the selected long training sequence on the frequency domain.

Optionally, the long training symbol generating unit is configured to, when the number of the system subcarriers is greater than the sequence length of the long training sequence, set a DC subcarrier in the system subcarriers as zero, select subcarriers in a number same as the sequence length of the long training sequence from non DC subcarriers in the system subcarriers, map elements in the long training sequence to the selected subcarriers, and interpolate a specific numerical value or a cyclic shift element of the long training sequence in a remaining non DC subcarrier in the system subcarriers to generate the long training symbol of the selected long training sequence on the frequency domain; or, the long training symbol generating unit is configured to, when the number of the system subcarriers is equal to the sequence length of the long training sequence, map elements in the long training sequence to the system subcarriers, and set a DC subcarrier in the system subcarriers as zero to generate the long training symbol of the selected long training sequence on the frequency domain; or, the long training symbol generating unit is configured to, when the number of the system subcarriers is less than the sequence length of the long training sequence, select elements in the number of the system subcarriers from elements of the long training sequence, map the selected elements to the system subcarriers, and set a DC subcarrier in the system subcarriers as zero to generate the long training symbol of the selected long training sequence on the frequency domain.

Optionally, the long training sequence selecting module 1703 is configured to select an unused long training sequence from the plurality of long training sequences, when the apparatus is located in an AP.

Optionally, selecting the unused long training sequence from the plurality of long training sequences, when the apparatus is located in the AP, includes:

selecting an unused basic training sequence from the plurality of basic training sequences;

or, selecting at least two unused basic training sequences from the plurality of basic training sequences and selecting a basic training sequence having the worst relativity with a basic training sequence in use from the at least two unused basic training sequences;

or, when a number of STAs associated with the AP is greater than a number of shift training sequences corresponding to a basic training sequence, selecting, by the AP, at least one unused basic training sequence.

Optionally, different basic training sequences are selected for adjacent APs.

Optionally, the long training sequence selecting module is configured to select a shift training sequence from shift training sequences generated from a basic training sequence corresponding to an AP associated with an STA, when the apparatus is located in the STA.

Optionally, the long training sequence selecting module is configured to select a shift training sequence from shift training sequences generated from a basic training sequence corresponding to a primary AP associated with an STA, when the apparatus is located in the STA and the STA in which the apparatus is located has a plurality of associated APs.

Optionally, the long training sequence selecting module is configured to select a shift training sequence having a maximum shift with a used shift training sequence from the shift training sequences generated from the basic training sequence corresponding to the AP associated with the STA in which the apparatus is located.

Optionally, when the apparatus is located in an STA, the apparatus further includes: a receiving module, configured to receive a long training sequence configured by an AP.

Optionally, the long training sequence selecting module is configured to generate a long training sequence identity according to identity information of a device in which the apparatus is located, and select a long training sequence corresponding to the long training sequence identity from the plurality of long training sequences.

Those of ordinary skill in the art may understand that all or a part of the steps in the above-mentioned embodiments are implemented by hardware, or by a computer program instructing corresponding hardware, the foregoing program may be stored in a computer readable storage medium, and the above-mentioned storage medium may be a random access memory, a magnetic disk, an optical disk or the like.

The foregoing descriptions are merely preferred embodiments of the present disclosure, rather than limiting the present disclosure. Any modifications, equivalent substitutions, improvements and the like made within the spirit and the principle of the present disclosure should be encompassed in the protection scope of the present disclosure.

What is claimed is:

1. A method for sending a signal, comprising:
    obtaining, by a local device, a plurality of long training sequences, wherein the plurality of long training sequences comprise a plurality of basic training sequences and a plurality of shift training sequences obtained according to a cyclic shift of the basic training sequences;
    obtaining, by the local device, a mapping rule between a terminal device and a long training sequence;
    selecting, by the local device, one of the plurality of long training sequences as a selected long training sequence according to the mapping rule; and
    sending, by the local device, a signal according to the selected long training sequence,
    wherein the sending the signal according to the selected long training sequence comprises:
    generating a long training symbol of the selected long training sequence on a frequency domain according to the selected long training sequence a sequence length of the selected long training sequence and a number of system subcarriers; and
    sending the signal according to the long training symbol of the selected long training sequence on the frequency domain.

2. The method according to claim 1, wherein the generating the long training symbol of the selected long training sequence on the frequency domain according to the selected long training sequence, the sequence length of the selected long training sequence and the number of the system subcarriers, comprises one of the following:
    when the number of the system subcarriers is greater than the sequence length of the selected long training sequence, setting a direct current (DC) subcarrier in the system subcarriers as zero, selecting subcarriers in a number that is the same as the sequence length of the selected long training sequence from non DC subcarriers in the system subcarriers, mapping elements in the selected long training sequence to the selected subcarriers, and interpolating one of a specific numerical value and a cyclic shift element of the selected long training sequence in a remaining non DC subcarrier in the system subcarriers to generate the long training symbol of the selected long training sequence on the frequency domain;
    when the number of the system subcarriers is equal to the sequence length of the selected long training sequence, mapping elements in the selected long training sequence to the system subcarriers, and setting a DC subcarrier in the system subcarriers as zero to generate the long training symbol of the selected long training sequence on the frequency domain; and
    when the number of the system subcarriers is less than the sequence length of the selected long training sequence, selecting elements in the number of the system subcarriers from elements of the selected long training sequence, mapping the selected elements to the system subcarriers, and setting a DC subcarrier in the system subcarriers as zero to generate the long training symbol of the selected long training sequence on the frequency domain.

3. The method according to claim 1, wherein the selecting the long training sequence according to the mapping rule comprises:
    when the local device is an access point (AP), selecting, by the AP, an unused long training sequence from the plurality of long training sequences.

4. The method according to claim 3, wherein when the local device is the AP, the selecting, by the AP, the unused long training sequence from the plurality of long training sequences, comprises one of the following:
    selecting an unused basic training sequence from the plurality of basic training sequences;
    selecting at least two unused basic training sequences from the plurality of basic training sequences and selecting a basic training sequence having a worst relativity with a basic training sequence in use from the at least two unused basic training sequences; and
    when a number of stations (STAs) associated with the AP is greater than a number of shift training sequences corresponding to a basic training sequence, selecting, by the AP, at least one unused basic training sequence.

5. The method according to claim 1, wherein adjacent access points (APs) select different basic training sequences.

6. The method according to claim 1, wherein the selecting the long training sequence according to the mapping rule comprises:
    when the local device is a station (STA), selecting a shift training sequence from shift training sequences generated from a basic training sequence corresponding to an access point (AP) associated with the STA.

7. The method according to claim 6, wherein when the local device is the STA, the selecting the shift training sequence from the shift training sequences generated from the basic training sequence corresponding to the AP associated with the STA, comprises:
    when the local device has a plurality of associated APs, selecting a shift training sequence from shift training sequences generated from a basic training sequence corresponding to a primary AP associated with the local device.

8. The method according to claim 6, wherein when the local device is the STA, the selecting the shift training sequence from the shift training sequences generated from the basic training sequence corresponding to the AP associated with the STA, comprises:

selecting a shift training sequence having a maximum shift with a used shift training sequence from the shift training sequences generated from the basic training sequence corresponding to the AP associated with the local device.

9. The method according to claim 1, wherein when the local device is a station (STA), the method further comprises: receiving a long training sequence configured by an access point (AP) associated with the local device.

10. The method according to claim 1, wherein the selecting the long training sequence according to the mapping rule comprises:

generating a long training sequence identity according to identity information of the local device, and selecting a long training sequence corresponding to the long training sequence identity from the plurality of long training sequences.

11. An apparatus for sending a signal, comprising:
a processor, configured to:
obtain a plurality of long training sequences, wherein the plurality of long training sequences comprise a plurality of basic training sequences and a plurality of shift training sequences obtained according to a cyclic shift of the basic training sequences;
obtain a mapping rule between a terminal device and a long training sequence;
select one of the plurality of long training sequences as a selected long training sequence according to the mapping rule; and
send a signal according to the selected long training sequence,
wherein the processor is configured to generate a long training symbol of the selected long training sequence on a frequency domain according to the selected long training sequence, a sequence length of the selected long training sequence and a number of system subcarriers; and
send the signal according to the long training symbol of the selected long training sequence on the frequency domain.

12. The apparatus according to claim 11, wherein the processor is configured to perform one of the following:
when the number of the system subcarriers is greater than the sequence length of the selected long training sequence, set a direct current (DC) subcarrier in the system subcarriers as zero, select subcarriers in a number that is the same as the sequence length of the selected long training sequence from non DC subcarriers in the system subcarriers, map elements in the selected long training sequence to the selected subcarriers, and interpolate one of a specific numerical value and a cyclic shift element of the selected long training sequence in a remaining non DC subcarrier in the system subcarriers to generate the long training symbol of the selected long training sequence on the frequency domain;
when the number of the system subcarriers is equal to the sequence length of the selected long training sequence, map elements in the selected long training sequence to the system subcarriers, and set a DC subcarrier in the system subcarriers as zero to generate the long training symbol of the selected long training sequence on the frequency domain; and
when the number of the system subcarriers is less than the sequence length of the selected long training sequence, select elements in the number of the system subcarriers from elements of the selected long training sequence, map the selected elements to the system subcarriers, and set a DC subcarrier in the system subcarriers as zero to generate the long training symbol of the selected long training sequence on the frequency domain.

13. The apparatus according to claim 11, wherein the processor is configured to select an unused long training sequence from the plurality of long training sequences, when the apparatus is located in an access point (AP).

14. The apparatus according to claim 13, wherein the processor is configured to perform one of the following:
select an unused basic training sequence from the plurality of basic training sequences;
select at least two unused basic training sequences from the plurality of basic training sequences and select a basic training sequence having a worst relativity with a basic training sequence in use from the at least two unused basic training sequences; and
when a number of stations (STAs) associated with the AP is greater than a number of shift training sequences corresponding to a basic training sequence, selecting, by the AP, at least one unused basic training sequence.

15. The apparatus according to claim 11, wherein adjacent access points (APs) select different basic training sequences.

16. The apparatus according to claim 11, wherein the processor is configured to select a shift training sequence from shift training sequences generated from a basic training sequence corresponding to an access point (AP) associated with a station (STA), when the apparatus is located in the STA.

17. The apparatus according to claim 11, wherein the processor is configured to select a shift training sequence from shift training sequences generated from a basic training sequence corresponding to a primary access point (AP) associated with a station (STA), when the apparatus is located in the STA and the STA in which the apparatus is located has a plurality of associated APs.

18. The apparatus according to claim 16, wherein the processor is configured to select a shift training sequence having a maximum shift with a used shift training sequence from the shift training sequences generated from the basic training sequence corresponding to the AP associated with the STA in which the apparatus is located.

19. The apparatus according to claim 11, wherein the processor is configured to generate a long training sequence identity according to identity information of a device in which the apparatus is located, and select a long training sequence corresponding to the long training sequence identity from the plurality of long training sequences.

* * * * *